United States Patent
Morita et al.

(10) Patent No.: US 8,805,398 B2
(45) Date of Patent: Aug. 12, 2014

(54) RADIO COMMUNICATION SYSTEM, BASE STATION APPARATUS, BASE STATION CONTROL APPARATUS, METHOD OF CONTROLLING TRANSMISSION POWER OF BASE STATION, AND COMPUTER READABLE MEDIUM

(75) Inventors: Motoki Morita, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/514,455

(22) PCT Filed: Nov. 24, 2010

(86) PCT No.: PCT/JP2010/006850
§ 371 (c)(1),
(2), (4) Date: Jun. 7, 2012

(87) PCT Pub. No.: WO2011/070733
PCT Pub. Date: Jun. 16, 2011

(65) Prior Publication Data
US 2012/0252479 A1    Oct. 4, 2012

(30) Foreign Application Priority Data

Dec. 8, 2009   (JP) ................................ 2009-278373

(51) Int. Cl.
*H04W 72/00* (2009.01)
(52) U.S. Cl.
USPC ......... 455/452.2; 455/522; 455/436; 370/311
(58) Field of Classification Search
USPC .............. 455/436, 456.1, 104, 423, 525, 444, 455/502, 437, 561, 422.1, 456.5, 452.2, 455/522; 370/328, 338, 331, 329, 352, 254, 370/311; 709/213; 726/4, 7
See application file for complete search history.

(56) References Cited

U.S. PATENT DOCUMENTS

2006/0046765 A1*   3/2006   Kogure .......................... 455/522
2007/0232346 A1*   10/2007   Takano et al. ................. 455/522
(Continued)

FOREIGN PATENT DOCUMENTS

JP    2001-339341 A    12/2001
JP    2003-037555 A    2/2003
(Continued)

OTHER PUBLICATIONS

Office Action dated Sep. 24, 2013 issued by the Korean State Intellectual Property Office in counterpart Korean Application No. 1020127013977.

*Primary Examiner* — Mahendra Patel
(74) *Attorney, Agent, or Firm* — Sughrue Mion, PLLC

(57) ABSTRACT

A base station (1) includes a radio communication unit (10) for performing radio communication with at least one mobile station (6), and a controller (11) for controlling transmission power of the radio communication unit (10). The controller (11) controls transmission power of an own cell signal by the radio communication signal (10) so that reception quality of the own cell signal transmitted from the radio communication unit (10) exceeds a second standard at a position of a mobile station at which reception quality of a peripheral cell signal is lower than a first standard based on a measurement result of reception quality by the mobile station (6) of a peripheral cell signal reached from a peripheral cell. Accordingly, it is possible to efficiently suppress occurrence of dead areas at cell boundaries.

45 Claims, 16 Drawing Sheets

(56) References Cited

U.S. PATENT DOCUMENTS

| | | | |
|---|---|---|---|
| 2007/0253372 A1* | 11/2007 | Nakayasu | 370/331 |
| 2009/0129305 A1* | 5/2009 | Malkamaki | 370/311 |
| 2009/0305741 A1* | 12/2009 | Takeuchi et al. | 455/561 |
| 2009/0323637 A1* | 12/2009 | Kashiwase et al. | 370/331 |
| 2009/0325623 A1* | 12/2009 | Morita et al. | 455/522 |
| 2010/0002654 A1* | 1/2010 | Lindoff et al. | 370/332 |

FOREIGN PATENT DOCUMENTS

| | | |
|---|---|---|
| JP | 2008-172380 A | 7/2008 |
| JP | 2009-124671 A | 6/2009 |
| JP | 2009-231912 A | 10/2009 |
| KR | 20020067010 | 8/2002 |
| WO | 2009/047972 A1 | 4/2009 |

* cited by examiner

RADIO COMMUNICATION SYSTEM, BASE STATION APPARATUS, BASE STATION CONTROL APPARATUS, METHOD OF CONTROLLING TRANSMISSION POWER OF BASE STATION, AND COMPUTER READABLE MEDIUM

CROSS REFERENCE TO RELATED APPLICATION

This application is a National Stage of International Application No. PCT/JP2010/006850 filed Nov. 24, 2010, claiming priority based on Japanese Patent Application No. 2009-278373 filed Dec. 8, 2009, the contents of all of which are incorporated herein by reference in their entirety.

TECHNICAL FIELD

The present invention relates to a radio communication system including a base station, and more particularly to a method of adjusting transmission power of the base station.

BACKGROUND ART

With the spread of mobile telephones in recent years, there have been increasing demands for voice communication and data communication by the mobile telephones not only from outdoors but also from indoors. In order to satisfy such an increase in demands, development of ultra small base stations that can be arranged indoors such as user's houses or small offices has been advancing. The area covered by such a base station is called a femtocell since such an area is extremely smaller than a coverage area of a base station arranged outdoors (hereinafter referred to as a macro base station). The cell means coverage of a base station (communication area that satisfies required quality). In the following description, such an ultra small base station is referred to as a femtocell base station. Examined as an operation form of the femtocell base station is a technique in which only a mobile station that is registered in advance connects to a femtocell base station to perform communication. Further, a femtocell base station may be arranged in such an area including upper floors of a building, or underground areas where radio waves are difficult to reach. Thus, the femtocell base station has attracted an attention as means for extending the coverage.

The femtocell base station is examined to be used in a system like a wideband code division multiple access (W-CDMA), an Evolved Universal Terrestrial Radio Access (E-UTRA: also referred to as a Long Term Evolution: LTE), and IEEE 802.16m. The W-CDMA and the E-UTRA are radio communication standards of mobile telephones. IEEE 802.16m is a radio communication standard of a wireless metropolitan area network (wireless MAN).

When the femtocell base station is used in the W-CDMA, data transmission using a dedicated channel in which transmission power in uplink and downlink is controlled and data transmission using a shared channel in the downlink are performed.

When the femtocell base station is used in the E-UTRA, a scheduler arranged in the base station allocates physical resource blocks (PRBs), whereby data transmission using the PRBs that are allocated is performed. The PRB is a basic unit of the radio resource in the downlink of E-UTRA employing an orthogonal frequency division multiple access (OFDMA), and includes a plurality of OFDM subcarriers in a frequency domain, and includes at least one symbol time in a time domain.

Further, OFDMA is also employed in the downlink of IEEE 802.16m. When the femtocell base station is used in IEEE 802.16m, the scheduler arranged in the base station allocates subcarriers, whereby data transmission using the subcarriers that are allocated is performed.

By the way, a base station in an existing mobile communication network transmits control signals called pilot signals to its coverage area (coverage). The mobile station receives the pilot signals to perform synchronization establishment with the base station, channel estimation and the like, and transmits/receives data to/from the base station. Accordingly, this allows the mobile station to receive the pilot signals transmitted from the base station with high quality, thereby capable of providing high communication quality. The same is applied to the femtocell base station as well.

In the base station in the existing mobile communication network, power saving can be achieved by suppressing transmission of the radio signals including the aforementioned pilot signals as much as possible. For example, a patent literature 1 discloses that a base station receives radio signals transmitted from a peripheral base station, and the base station adjusts its own transmission power using the state of traffic of the peripheral base station and the measurement result of reception power of the signals transmitted from the peripheral base station. More specifically, the base station according to the patent literature 1 reduces or stops the transmission power of an own station when the traffic of the peripheral base station is low and the reception power of the radio signal from the peripheral base station satisfies a predetermined quality.

Further, a patent literature 2 discloses a technical method of adjusting transmission power of a base station as is similar to that in the patent literature 1 described above. More specifically, the patent literature 2 discloses that a complementary base station measures reception power of radio signals transmitted from a peripheral base station to adjust its own transmission power according to the measurement result in order to efficiently cover areas (dead areas) which are not sufficiently covered by the peripheral base stations.

Further, a patent literature 3 discloses a method of optimizing a radio parameter (including transmission power) of a new base station when the base station is newly provided. More specifically, according to the patent literature 3, a mobile station measures reception power of radio waves from the new base station and its peripheral base stations in order to optimize the radio parameter of the new base station. Then, the new base station adjusts the radio parameter of an own station based on the measurement result of the mobile station.

A patent literature 4 discloses a technique related to handover of a mobile station to a femtocell. More specifically, the mobile station disclosed in the patent literature 4 receives radio signals from a peripheral base station, measures reception quality, and acquires a group identifier of the peripheral base station. The mobile station then identifies whether the group identifier that is acquired corresponds to a femtocell base station to which the mobile station itself is able to connect, and transmits the measurement result of the reception quality to the base station that is being connected under a condition that the group identifier relates to the femtocell base station to which the mobile station is able to connect. Accordingly, the start of the handover of the mobile station to the femtocell base station to which the mobile station is not able to connect can be suppressed.

CITATION LIST

Patent Literature

PTL 1: Japanese Unexamined Patent Application Publication No. 2003-037555

PTL 2: Japanese Unexamined Patent Application Publication No. 2001-339341

PTL 3: Japanese Unexamined Patent Application Publication No. 2008-172380

PTL 4: Japanese Unexamined Patent Application Publication No. 2009-124671

SUMMARY OF INVENTION

Technical Problem

The present inventors of this invention have found that the method of adjusting the transmission power of the base station disclosed in the patent literatures 1 and 2 includes the following problems. That is, according to the patent literatures 1 and 2, when the transmission power of the base station is increased or decreased in order to change the coverage size of the base station, only the reception quality of the peripheral cell (peripheral base station) at the position at which the base station is arranged is considered. In other words, when the coverage size of the base station is determined, it is not considered whether the area of the mobile station connected to the base station (periphery of the base station) is sufficiently covered by the peripheral cell. Accordingly, there are generated dead areas which are not sufficiently covered by any of the base stations, which may degrade communication quality of the mobile station.

With reference to FIGS. 19A to 19C, this problem will be described in detail. FIGS. 19A to 19C show three system configurations according to the relative positional relation between coverage of a macro cell 92 formed by a macro base station 91 and coverage of a femtocell 94 formed by a femtocell base station 93. There is a mobile station (registered mobile station) 95 in each femtocell, and the mobile station 95 communicate with the femtocell base station 93 according to the request of communication by a user. Now, the term "registered mobile station" means a mobile station which is allowed to connect to a femtocell. Meanwhile, a mobile station which is not allowed to connect to the femtocell is referred to as a "non-registered mobile station".

Hereinafter, operation states (start or stop) of the femtocell base station in each of three system configurations will be described. First, FIG. 19A shows a case in which the femtocell 94 is completely included in the macro cell 92. At this time, it is considered that the reception power of the radio signal from the macro base station 91 in the area where the femtocell base station 93 is installed is large. When it is assumed that the traffic of the macro base station 91 is small, according to the technique disclosed in the patent literature 1, the femtocell base station 93 stops the operation, and the mobile station 95 communicates with the macro base station 91.

Next, FIG. 19B shows a case in which the femtocell 94 does not overlap with the macro cell 92 at all. In this case, it is considered that the reception power of the radio signal from the macro base station 91 in the area where the femtocell base station 93 is installed is extremely small or it is impossible to receive radio signals. When it is assumed that the traffic of the macro base station 91 is small, according to the technique disclosed in the patent literature 1, the femtocell base station 93 starts, and the mobile station 95 communicates with the femtocell base station 93.

Last, FIG. 19C shows a case in which a part of the femtocell 94 overlaps with the macro cell 92, and the area in which the femtocell base station 93 is installed is covered in the macro cell 92. In short, in this case, the femtocell base station 93 is arranged in an edge of the macro cell 92. In this case, it is considered that the reception power of the radio signals from the macro base station 91 in the area where the femtocell base station 93 is installed is relatively small but still allows communication. When it is assumed that the traffic of the macro base station 91 is small, according to the technique disclosed in the patent literature 1, the femtocell base station 93 stops the operation. However, the position of the mobile station 95 is outside the macro cell 92. Thus, when the femtocell base station 93 stops the operation under a condition in which the position of the femtocell base station 93 is covered by the macro cell 92, the mobile station 95 is able to communicate with no base station.

As described above, it is not necessary that the mobile station which belongs to the femtocell base station can also receive radio waves of the macro base station even when the femtocell base station itself can receive radio waves of the macro base station. Thus, according to the techniques disclosed in the patent literatures 1 and 2, as shown in FIG. 19C, it is impossible to secure the appropriate coverage, which may generate dead areas. Since eliminating the dead areas of the macro cell is one object to introduce the femtocell, it is desirable that generation of dead areas can be avoided.

As described above, the patent literature 4 discloses that the mobile station measures the reception power of radio waves reached from the new base station and its peripheral base stations, and the radio parameter of the new base station is adjusted based on the measurement result of the mobile station. However, the patent literature 4 neither includes description regarding the aforementioned problems nor discloses how to adjust the transmission power of the new base station in detail.

The present invention has been made based on the above-mentioned study, and aims to provide a radio communication system, a base station control apparatus, a base station apparatus, a method of controlling transmission power of a base station, and a program that are capable of efficiently suppressing occurrence of dead areas at cell boundaries.

Solution to Problem

A radio communication system according to a first exemplary aspect of the present invention includes: a first base station transmitting a first radio signal; a second base station transmitting a second radio signal; at least one radio terminal capable of receiving the first and second radio signals; and a control unit. The control unit controls transmission power of the second radio signal by the second base station so that reception quality of the second radio signal exceeds a second standard at a position of the radio terminal at which reception quality of the first radio signal is lower than a first standard based on a measurement result of reception quality of the first radio signal by the at least one radio terminal.

A base station apparatus according to a second exemplary aspect of the present invention includes: a radio communication unit for performing radio communication with at least one mobile station; and a control unit for controlling transmission power of the radio communication unit. The control unit controls transmission power of an own cell signal by the radio communication means so that reception quality of the own cell signal transmitted by the radio communication means exceeds a second standard at a position of the radio terminal at which reception quality of a peripheral cell signal is lower than a first standard based on a measurement result of reception quality by the at least one mobile station of a peripheral cell signal reached from a peripheral cell.

A control apparatus according to a third exemplary aspect of the present invention includes a control unit for controlling transmission power of an own cell signal so that reception quality of the own cell signal transmitted from a base station performing radio communication with at least one mobile station exceeds a second standard at a position of a mobile station at which the reception quality of a peripheral cell signal is lower than a first standard based on a measurement result by the at least one mobile station of reception quality of the peripheral cell signal reached from a peripheral cell.

A method of controlling transmission power of a base station according to a fourth exemplary aspect of the present invention includes the following steps (a) and (b): (a) obtaining a measurement result by at least one mobile station of reception quality of a peripheral cell signal reached from a peripheral cell; and (b) controlling transmission power of an own cell signal so that reception quality of the own cell signal transmitted from a base station performing radio communication with the at least one mobile station exceeds a second standard at a position of the mobile station at which the reception quality of the peripheral cell signal is lower than a first standard based on the measurement result.

A fifth exemplary aspect of the present invention relates to a program to cause a computer to execute control processing regarding base station equipment performing radio communication with a mobile station. The control processing performed by the computer executing the program includes the following steps (a) and (b): (a) acquiring a measurement result by at least one mobile station of reception quality of a peripheral cell signal reached from a peripheral cell; and (b) controlling transmission power of an own cell signal so that reception quality of the own cell signal transmitted from a base station performing radio communication with the at least one mobile station exceeds a second standard at a position of the mobile station at which the reception quality of the peripheral cell signal is lower than a first standard based on the measurement result.

Advantageous Effects of Invention

According to each aspect of the present invention described above, it is possible to provide a radio communication system, a base station control apparatus, a base station apparatus, a method of controlling transmission power of a base station, and a program that are able to efficiently suppress occurrence of dead areas in cell boundaries.

DESCRIPTION OF EMBODIMENTS

Hereinafter, with reference to the drawings, specific exemplary embodiments of the present invention will be described in detail. Throughout the drawings, the same components are denoted by the same reference symbols, and overlapping description will be omitted as appropriate for the clarification of description.

First Exemplary Embodiment of the Present Invention

Figure 1:
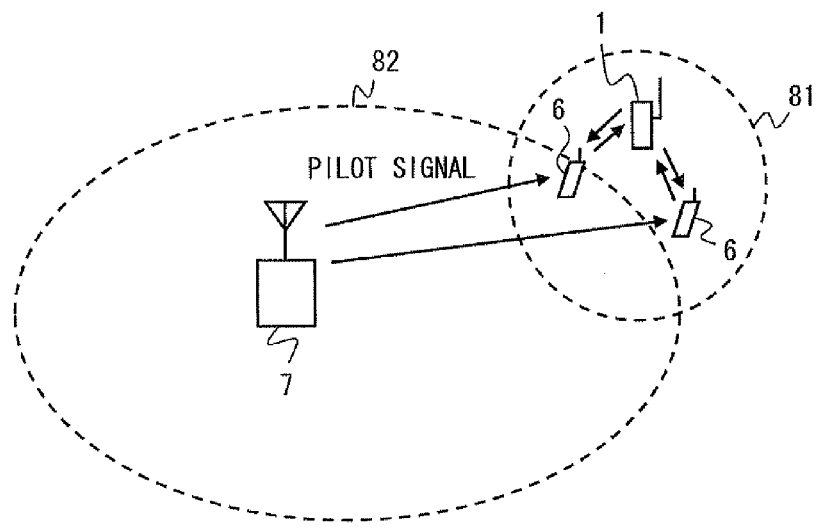
FIG. 1 is a diagram showing a configuration example of a radio communication system according to a first exemplary embodiment of the present invention.

FIG. 1 is a diagram showing a configuration example of a radio communication system according to a first exemplary embodiment. The radio communication system according to the first exemplary embodiment includes at least one femtocell base station 1, at least one radio terminal 6, and at least one peripheral base station 7. The femtocell base station 1 forms a femtocell 81, and performs radio communication with the radio terminal 6. The peripheral base station 7 forms a peripheral cell 82. The peripheral base station 7 is a base station (macro cell base station) forming a macro cell, for example. The radio terminal 6 is able to communicate with the femtocell base station 1, and is able to receive radio signals transmitted from the peripheral base station 7. The radio terminal 6 includes a mobile station such as a mobile telephone terminal, for example, and a fixed terminal fixedly arranged. In the following description, the radio terminal 6 is assumed to be a mobile station. When the femtocell base station 1 limits access to allow connection by only a specific terminal group (CSG: Closed Subscriber Group), the mobile station 6 may be a "registered mobile station" included in the CSG which is allowed to access the femtocell base station 1.

Figure 2:
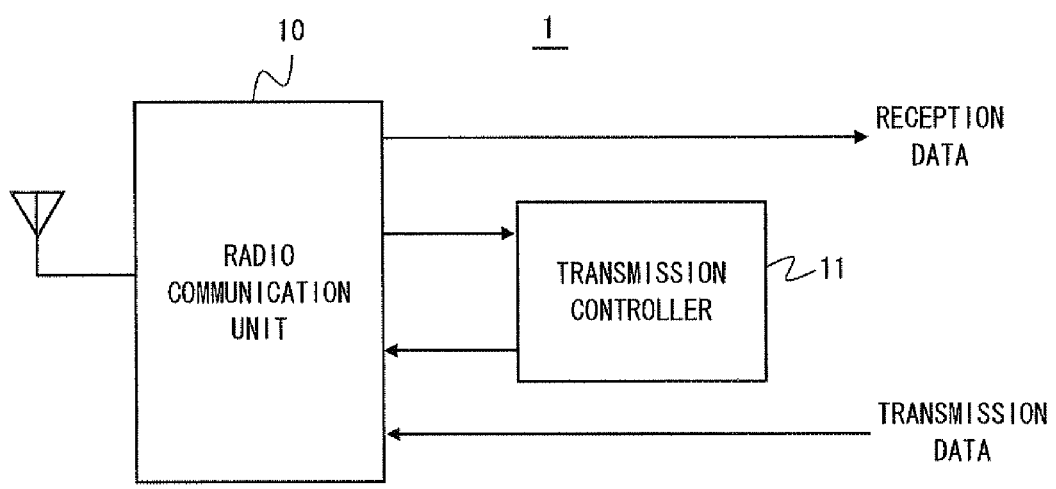
FIG. 2 is a block diagram showing a configuration example of a femtocell base station according to the first exemplary embodiment of the present invention.

FIG. 2 is a block diagram showing a configuration example of the femtocell base station 1. In FIG. 1, a radio communication unit 10 performs interactive radio communication with the mobile station 6. The radio communication unit 10 transmits downlink radio signals in which control data and user data are encoded to the mobile station 6, and receives uplink radio signals transmitted from the mobile station 6. The radio communication unit 10 decodes data from the uplink radio signals. Further, the radio communication unit 10 decodes a measurement report of "peripheral cell reception quality" and supplies the decoded signal to a transmission controller 11. Information of a transmission timing and a transmission frequency of the measurement report by the mobile station 6 may be determined by the femtocell base station 1 or a higher-order network in advance, and may be reported by the femtocell base station 1 to the mobile station 6.

The "peripheral cell reception quality" includes information regarding reception quality of the radio signals from the peripheral base station 7 measured by the mobile station 6. Now, the reception quality includes reception power of pilot signals, reference signals or the like, or Signal to Interference Ratio (SIR), for example. In the case of a W-CDMA, the peripheral cell reception quality may be reception quality (CPICH Ec/No) or reception power (CPICH RSCP: Received Signal Code Power) of a common pilot channel (CPICH), for example. Further, in the case of an E-UTRA, the peripheral cell reception quality may be reception quality (RSRQ: Reference Signal Received Quality) or reception power (RSRP: Reference Signal Received Power) of downlink reference signals, for example.

The transmission controller 11 controls transmission power of the radio communication unit 10 using the "peripheral cell reception quality" reported from the mobile station 6. More specifically, the transmission controller 11 may determine the transmission power so that the mobile station 6 is able to receive radio waves from at least one cell over a range in which the mobile station 6 moves. For example, the transmission controller 11 may reduce transmission power of the radio communication unit 10 or stop transmission by the radio communication unit 10 under a condition in which the mobile station 6 is able to communicate with at least one peripheral cell 82 even when the femtocell base station 1 is stopped.

Figure 3:
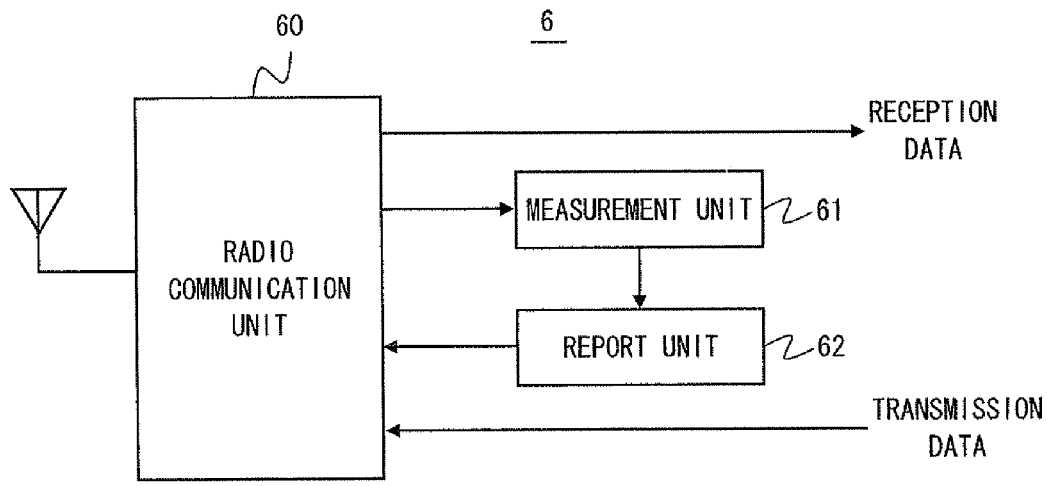
FIG. 3 is a block diagram showing a configuration example of a mobile station according to the first exemplary embodiment of the present invention.

FIG. 3 is a block diagram showing a configuration example of the mobile station 6. A radio communication unit 60 performs interactive radio communication with the femtocell base station 1. The radio communication unit 60 transmits uplink radio signals in which control data and user data are encoded to the base station 1, and receives downlink radio signals transmitted from the base station 1. The radio communication unit 60 decodes the reception data from the downlink radio signal. Upon decoding measurement instructions reported by the femtocell base station 1, the radio communication unit 60 supplies the decoded data to a measurement unit 61.

The measurement unit 61 performs measurement of the peripheral cell reception quality according to the measurement instructions from the femtocell base station 1. The measurement unit 61 causes the radio communication unit 60 to receive downlink radio signals (e.g., pilot signals) from the peripheral base station 7, thereby being able to measure the reception quality including SIR, the peripheral cell reception power and the like.

A report unit 62 reports the measurement result of the peripheral cell reception quality to the femtocell base station 1 through the radio communication unit 60. The transmission frequency or the transmission timing of the measurement report may be determined according to the information determined by the femtocell base station 1 or a higher-order network in advance.

Figure 4:
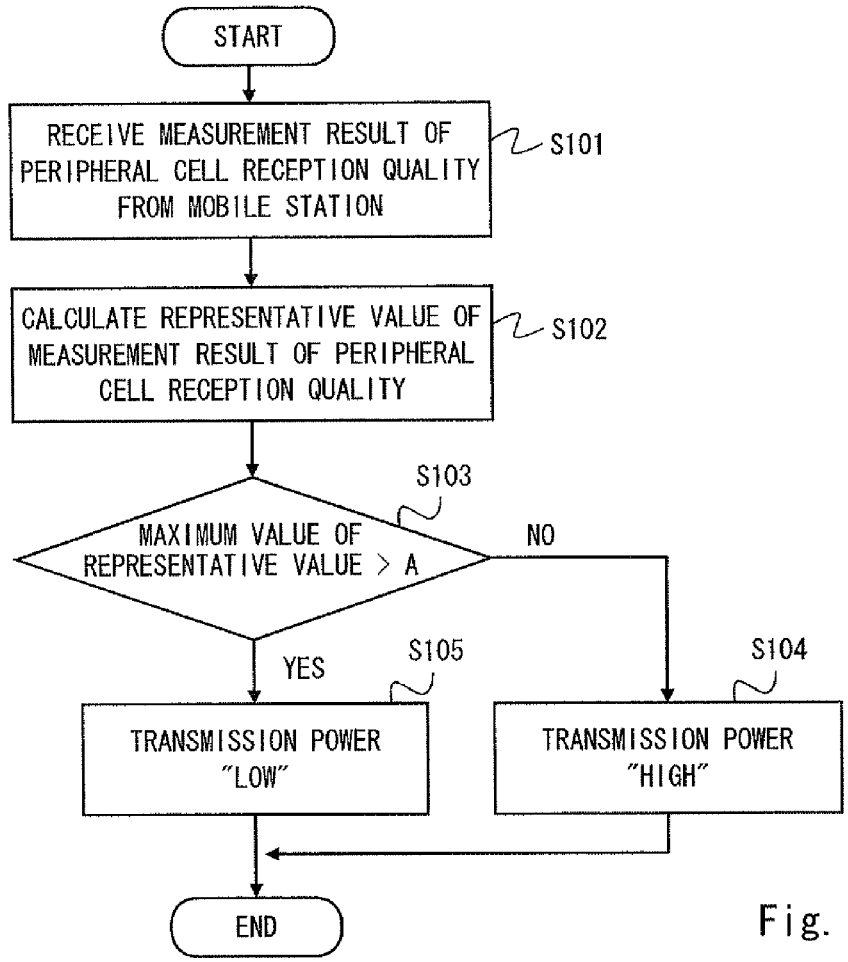
FIG. 4 is a flowchart showing a specific example of procedures for controlling transmission power in the femtocell base station according to the first exemplary embodiment of the present invention.

In the following description, operations for adjusting an output of the femtocell base station 1 using the measurement report from the mobile station 6 will be described. FIG. 4 is a flowchart showing a specific example of procedures for adjusting the output of the femtocell base station 1. In the example shown in FIG. 4, it is assumed that at least one mobile station 6 exists within a communication range of the femtocell base station 1. In Step S101, the transmission controller 11 receives the measurement result of the peripheral cell reception qualities from the mobile station 6. When there are a plurality of mobile stations 6 connected to the femtocell 81, the transmission controller 11 may receive the measurement report from the plurality of mobile stations 6. Further, the transmission controller 11 may receive the plurality of peripheral cell reception qualities measured by one mobile station 6 at different time and at different positions. Further, when the mobile station 6 is able to receive radio waves from the plurality of peripheral cells 82, the transmission controller 11 may receive the peripheral cell reception quality regarding the plurality of peripheral cells 82 from the mobile station 6.

In Step S102, the transmission controller 11 calculates a representative value of the reception qualities for each of the plurality of peripheral cells 82. The representative value may be a value in which cumulative probability becomes X percent (X is any desired number from 0 to 100) when the measurement values are accumulated in an ascending order of reception quality, for example. Further, the representative value may be other statistical values including a minimum value or an average value of the plurality of measurement values of the reception quality.

In Step S103, the transmission controller 11 selects the maximum value from representative values of the peripheral cell reception qualities calculated for each peripheral cell 82, and compares the maximum value with a threshold A. The threshold A may be predetermined based on the quality level in which the mobile station 6 is able to keep radio communication with the base station in advance. That the maximum value selected from the representative values of the peripheral cell reception qualities for each peripheral cell 82 is below the threshold A means that the reception quality of the peripheral cell 82 is not sufficient to keep the communication at a position of the mobile station 6 connected to the femtocell base station 1. In this case, when the maximum value among the plurality of representative values is below the threshold A (NO in Step S103), the transmission controller 11 keeps the transmission power of the radio communication unit 10 relatively high (Step S104). In short, the transmission controller 11 continues transmission by the femtocell base station 1.

On the other hand, that the maximum value selected from the plurality of representative values exceeds the threshold A means that the reception quality of the peripheral cell 82 is sufficiently high at a position of the mobile station 6 connected to the femtocell base station 1. When the maximum value exceeds the threshold A (YES in Step S103), the transmission controller 11 keeps the transmission power of the radio communication unit 10 relatively low (Step S105). When the transmission power of the femtocell base station 1 is reduced, the transmission power of the radio communication unit 10 may be stopped. Alternatively, the transmission power of the radio communication unit 10 may be gradually reduced. Further, while the control of the transmission power is performed in each of the state in which the maximum value exceeds the threshold A and the state in which the maximum value does not exceed the threshold A according to the first exemplary embodiment, the control may be performed in any one of the states.

In Step S103 of FIG. 4, the maximum value is selected from the representative values of the peripheral cell reception qualities for each of the peripheral cells 82. However, in this example, the minimum value may be selected, or other statistical values including an average value may be used instead. Further, the femtocell base station 1 needs not use all the measurement values of the reception quality reported from the mobile station 6. For example, when there are a plurality of mobile stations 6, the femtocell base station 1 may select and use the measurement value reported from a specific mobile station. Further, the femtocell base station 1 may select and use the measurement value at specific time or time period.

Figure 5:
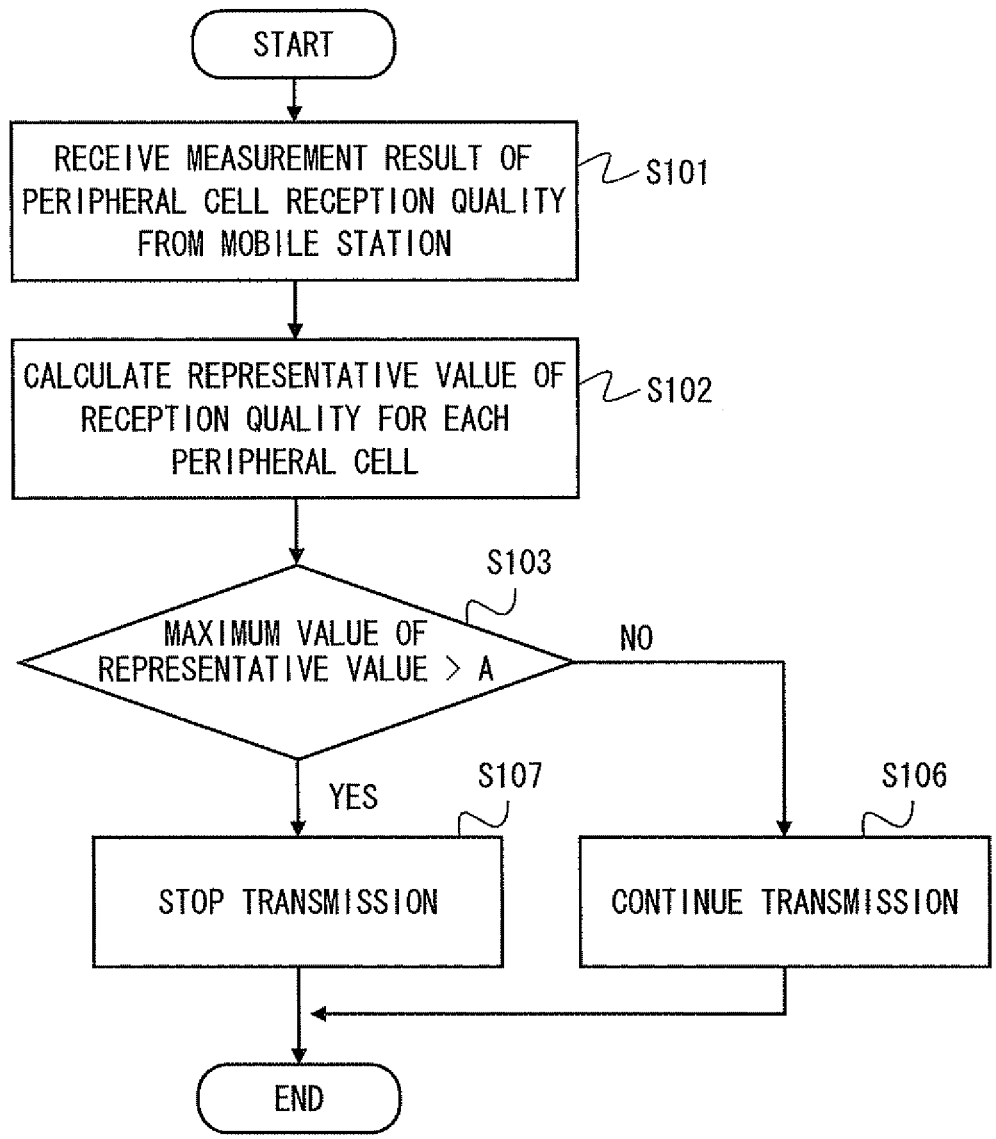
FIG. 5 is a flowchart showing another example of the procedures for controlling transmission power in the femtocell base station according to the first exemplary embodiment of the present invention.

FIG. 5 is a flowchart showing another example of the procedures for adjusting the output of the femtocell base station 1. In the example shown in FIG. 5, the transmission by the radio communication unit 10 is continued when the maximum value among the plurality of representative values is below the threshold A (NO in Step S103) (Step S106). On the other hand, the transmission by the radio communication unit 10 is stopped when the maximum value among the plurality of representative values exceeds the threshold A (YES in Step S103) (Step S107).

As described above, the femtocell base station 1 according to the first exemplary embodiment controls the output of the femtocell base station 1 using the peripheral cell reception quality at the position of the mobile station measured by the mobile station 6. Accordingly, even when the position where the mobile station 6 is located is not sufficiently covered by the peripheral cell 82, the transmission by the femtocell base station 1 can be continued. Thus, it is expected that the reception quality in the dead area exceeds a predetermined quality standard by the transmission by the femtocell base station 1 when the dead area is generated only with the peripheral cell 82. Accordingly, it is possible to suppress reduction in communication quality of the mobile station 6.

Figure 19A:
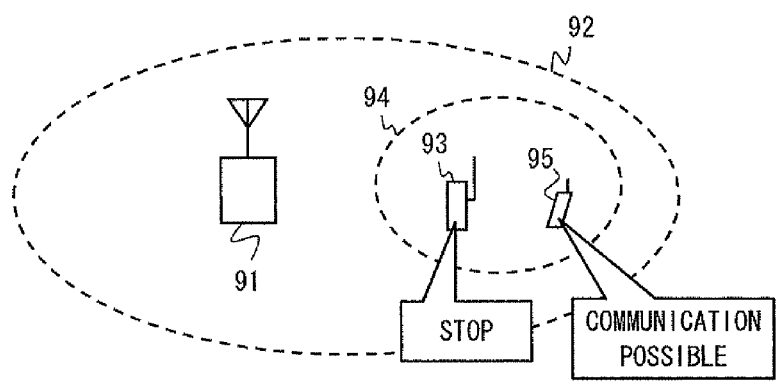
FIG. 19A is a diagram showing a relative positional relation between coverage of a macro cell and coverage of a femtocell.
Figure 19B:
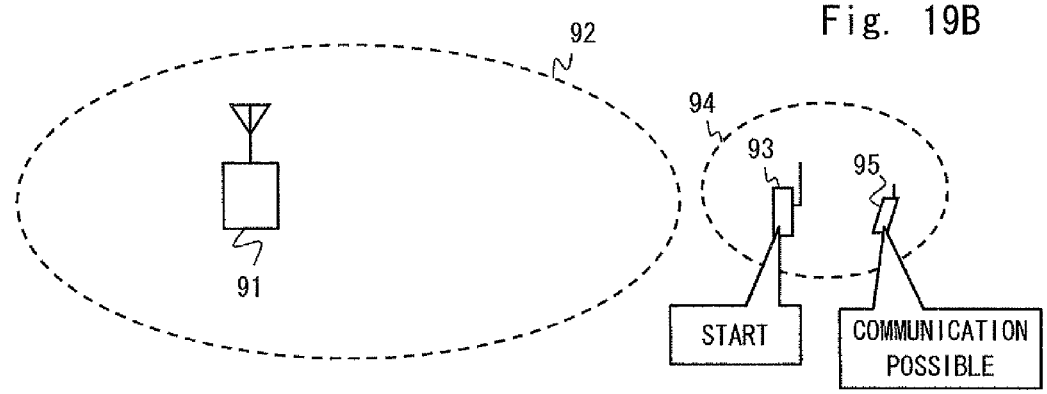
FIG. 19B is a diagram showing a relative positional relation between coverage of a macro cell and coverage of a femtocell.
Figure 19C:
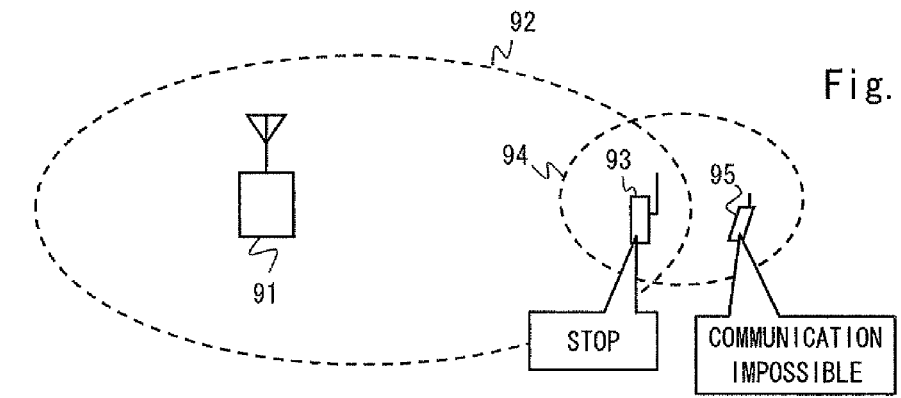
FIG. 19C is a diagram showing a relative positional relation between coverage of a macro cell and coverage of a femtocell.

For example, as described above, the femtocell base station 1 is able to use the peripheral cell reception quality at the position of the mobile station 6 which is in a communication range of the femtocell base station 1 to determine whether to stop transmission by the radio communication unit 10. Accordingly, the femtocell base station 1 is able to correctly determine whether the mobile station 6 which is in a communication range of the femtocell base station 1 is able to perform communication with the peripheral base station 7 when the transmission stops. For example, when the peripheral cell 82, the femtocell base station 1, and the mobile station 6 according to the first exemplary embodiment have the same positional relation as the macro cell 92, the femtocell base station 93, and the mobile station 95 shown in FIG. 19C, the transmission by the femtocell base station 1 can be continued since the peripheral cell reception quality in the mobile station 6 is not sufficient. Accordingly, it is possible to prevent such a state in which the mobile station 6 cannot communicate with any base station.

Further, for example, it is possible to determine the moving range of the mobile station, i.e., whether the femtocell 81 is sufficiently covered by at least one peripheral cell 82 by accumulating the plurality of peripheral cell reception qualities measured at a plurality of positions. For example, when the peripheral cell reception quality is low at a part in the femtocell 81, the transmission by the radio communication unit 10 may be continued. On the other hand, when the peripheral cell reception quality is sufficient at almost all the places in the femto cell 81, the femto cell base station 1 may stop the transmission. This is because the influence on the coverage is small. Accordingly, the femtocell base station 1 is able to determine whether to stop the transmission while keeping the coverage with the peripheral cell 82. Further, the stop of the transmission can reduce power consumption.

Note that the femtocell base station 1 itself may measure the peripheral cell reception quality in addition to the mobile station 6. In this case, the femtocell base station 1 may stop the transmission by the femtocell base station 1 when both of the peripheral cell reception quality at the position of the mobile station, and the peripheral cell reception quality at the position where the femtocell base station 1 is arranged are high, and continue the transmission by the femtocell base station 1 when one of the reception qualities is below the standard.

The procedures for adjusting the transmission power shown in FIG. 4 may be achieved by causing a computer such as a microprocessor to execute a program to control base stations. In summary, it is possible to cause a computer executing a base station control program to refer to the measurement values of the peripheral cell reception qualities, compare with a predetermined threshold, and determine possibility to reduce transmission power (including possibility of stop).

Second Exemplary Embodiment of the Present Invention

Figure 6:
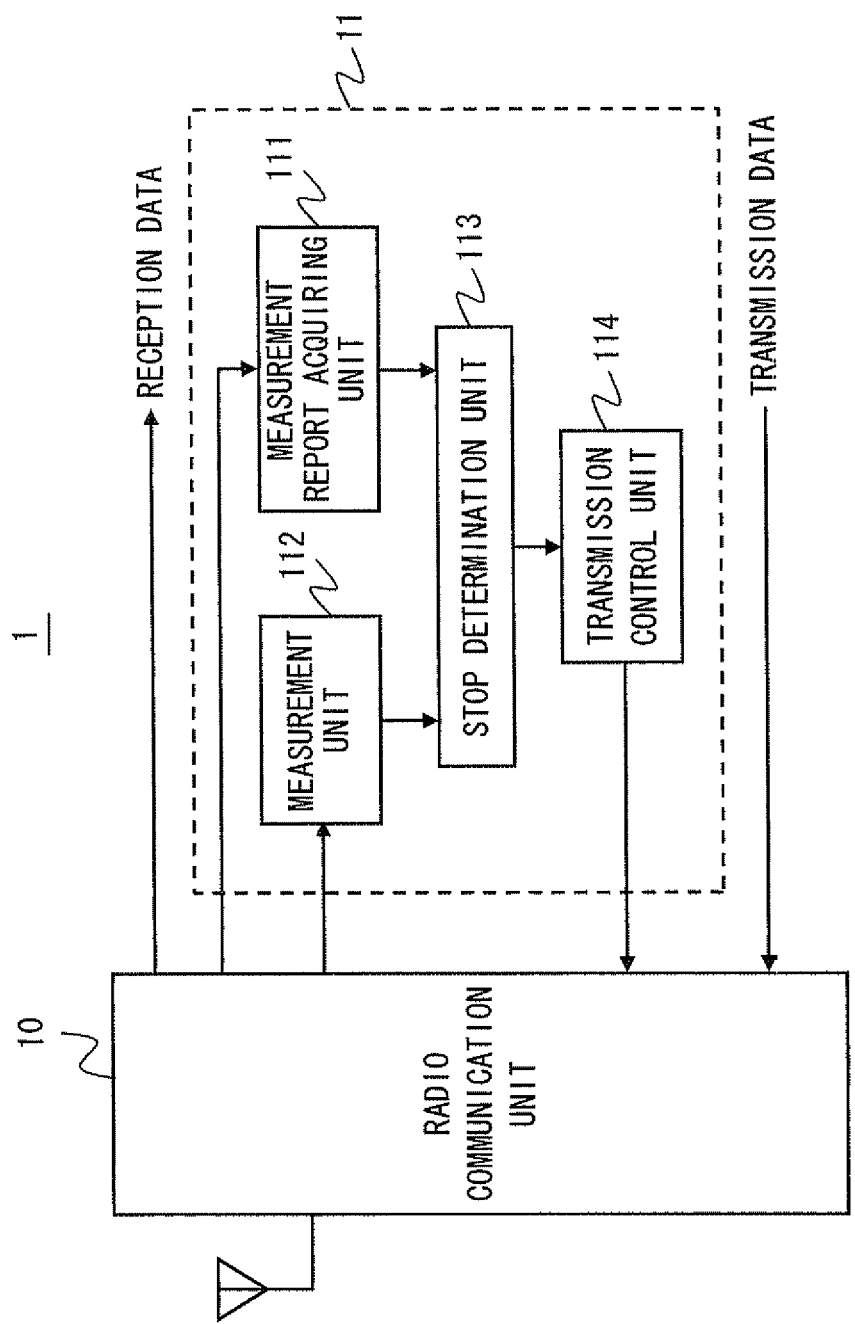
FIG. 6 is a block diagram showing a configuration example of a femtocell base station according to a second exemplary embodiment of the present invention.

In a second exemplary embodiment, an example in which the femtocell base station 1 itself also measures peripheral cell reception qualities in addition to the mobile station 6. Note that the whole configuration of a radio communication system according to the second exemplary embodiment may be similar to the configuration shown in FIG. 1 according to the first exemplary embodiment. FIG. 6 is a block diagram showing a configuration example of the femtocell base station 1 according to the second exemplary embodiment. A transmission controller 11 shown in FIG. 6 includes a function of measuring the peripheral cell reception qualities by the femtocell 81 itself in addition to a function included in the transmission controller 11 shown in FIG. 2.

A measurement report acquiring unit 111 receives a measurement report from the mobile station 6 decoded by the radio communication unit 10. A measurement unit 112 measures reception qualities of radio signals (e.g., pilot signals) that reach from the peripheral cell 82 to the radio communication unit 10. A stop determination unit 113 determines whether to stop transmission by the radio communication unit 10 using the peripheral cell reception quality measured by the mobile station 6 and the peripheral cell reception quality measured by the femtocell base station 1 (measurement unit 112). A transmission controller 114 controls the radio communication unit 10 according to the determination result by the stop determination unit 113. The transmission controller 114 may reduce the transmission power of the radio communication unit 10 by a certain amount or may stop the transmission of all the radio signals including pilot signals.

Figure 7:
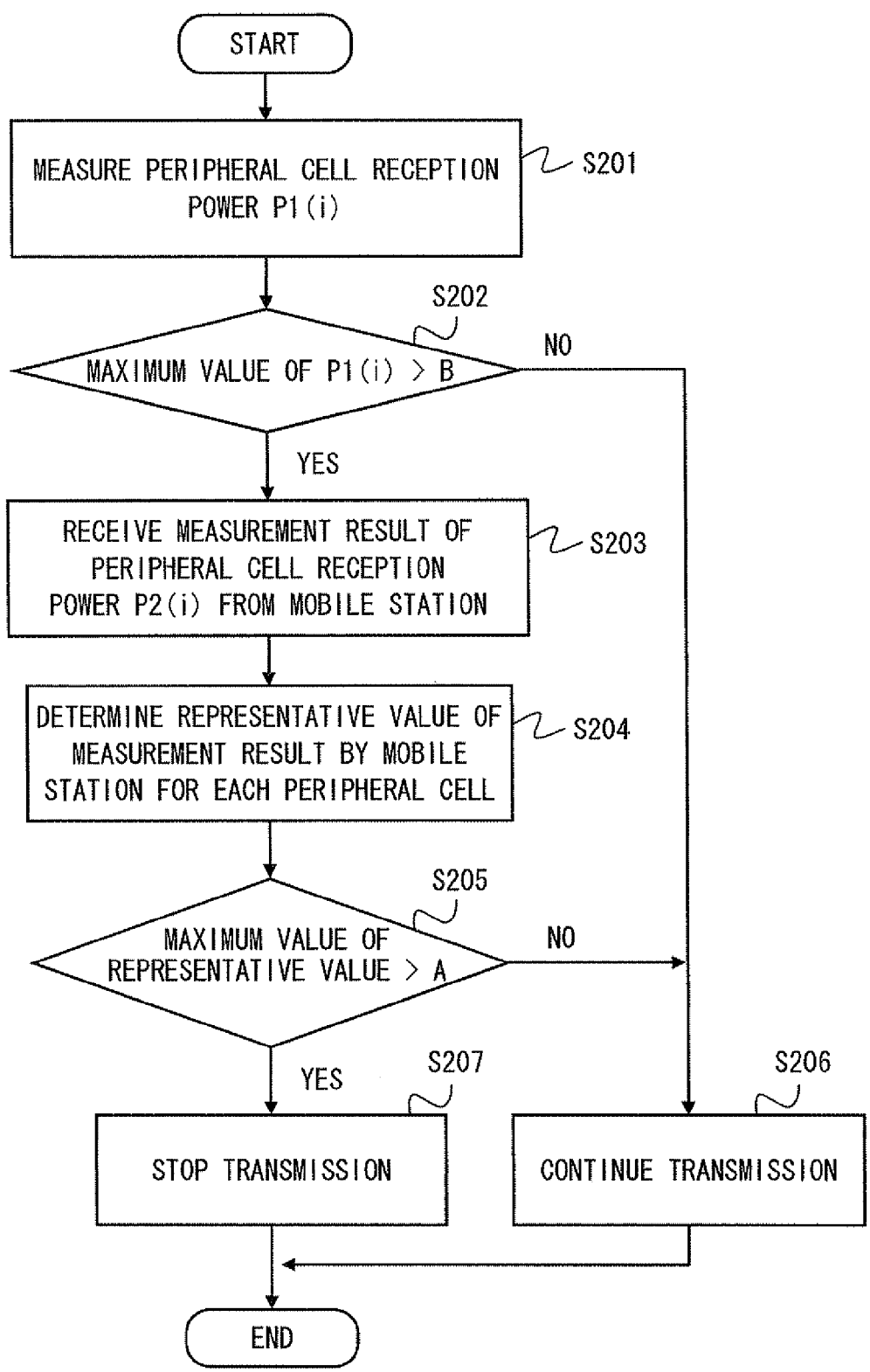
FIG. 7 is a flowchart showing a specific example of procedures for controlling transmission power in the femtocell base station according to the second exemplary embodiment of the present invention.

FIG. 7 is a flowchart showing a specific example of procedures for controlling transmission power of the femtocell base station 1 according to the second exemplary embodiment. FIG. 7 shows a case in which the reception power is measured as a specific example of the peripheral cell reception quality. Steps S201 and S202 relate to the transmission control using the peripheral cell reception quality at the position where the femtocell base station 1 is arranged. In Step S201, the measurement unit 112 measures the reception power P1(i) of N peripheral cells 82 (where i is an integer from 1 to N). When it is possible to receive only radio waves reached from one peripheral cell 82, the measurement unit 112 may measure the reception power for one peripheral cell 82. On the other hand, when it is possible to receive radio waves reached from a plurality of peripheral cells 82, the measurement unit 112 may measure the reception power of all the peripheral cells 82, or may measure the reception power of a predetermined number of peripheral cells 82. Further, the measurement unit 112 may measure the peripheral cell 82 whose reception power is a predetermined standard or more.

In Step S202, the stop determination unit 113 selects a maximum value from among N reception power P(i)-P(N) obtained for the N peripheral cells 82 which are measurement targets, and compares the selection value with a threshold B. The threshold B may be the same to or different from the threshold A with respect to the peripheral cell reception quality (in this example, reception power P2) measured by the mobile station 6. When the maximum value of the reception power P(i)-P(N) is lower than the threshold B (NO in Step S202), the stop determination unit 113 continues the transmission by the radio communication unit 10 (Step S206). On the other hand, when the maximum value of the reception power P(i)-P(N) exceeds the threshold B (YES in Step S202), the stop determination unit 113 goes to Step S203.

While the example using the maximum value of the reception power P(i)-P(N) has been described in Step S202 of FIG. 7, a minimum value may be used, or other statistical values such as an average value may be used.

Steps S203-S207 in FIG. 7 are the same to the procedures shown in FIG. 5 except that the peripheral cell reception power is specifically used as the peripheral cell reception quality. In Step S207, the transmission power may be reduced compared to the case in which the transmission is continued (S206) instead of stopping the transmission by the radio communication unit 10. The reduction in transmission power of the radio communication unit 10 may be gradually performed.

Figure 8:
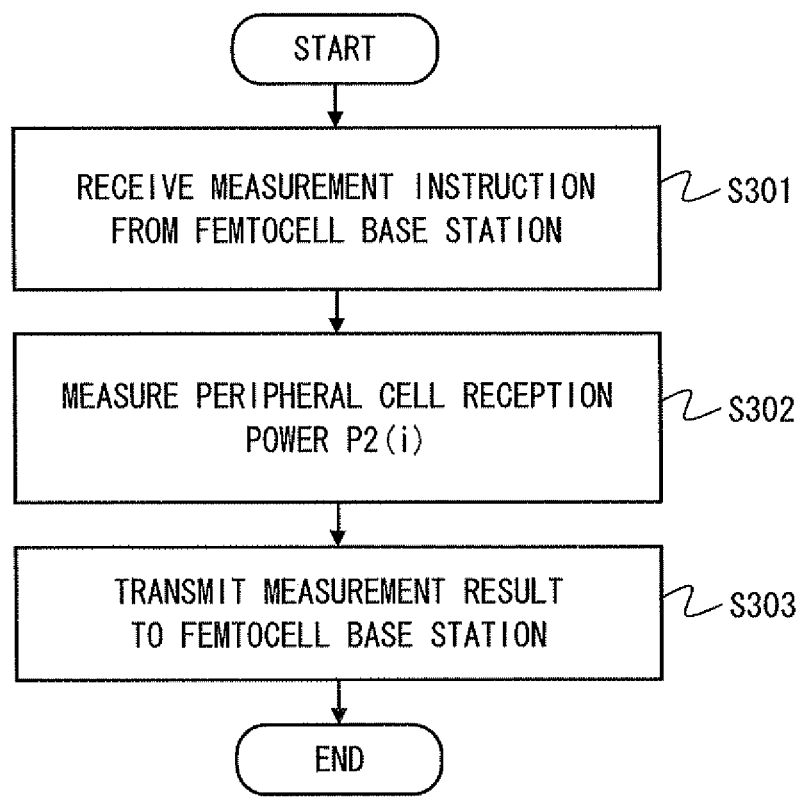
FIG. 8 is a flowchart showing a specific example of procedures for operating a mobile station according to the second exemplary embodiment of the present invention.

FIG. 8 is a flowchart showing a specific example of procedures for measuring and reporting the peripheral cell reception qualities by the mobile station 6. Note that FIG. 8 shows a case in which reception power is measured as a specific example of the peripheral cell reception quality. In Step S301, the measurement unit 61 receives a measurement instruction from the femtocell base station 1 through the radio communication unit 60. The measurement instruction may include information of the transmission in timing or a transmission frequency of the measurement report.

In Step S302, the measurement unit 61 measures the reception power P2(i) of the radio signal reached from the M peripheral cells 82 (where i is an integer from 1 to M). When the mobile station 6 is able to receive only radio waves reached from one peripheral cell 82, the measurement unit 61 may measure the reception power for this one peripheral cell 82. On the other hand, when the mobile station 6 is able to receive radio waves reached from a plurality of peripheral cells 82, the measurement unit 61 may measure the reception power for all the peripheral cells, or may measure the reception power of a predetermined number of peripheral cells 82. Further, the measurement unit 61 may measure the peripheral cell 82 whose reception power is a predetermined standard or more.

In Step S303, the report unit 62 reports the measurement result of the reception power P2(i) by the measurement unit 61 to the femto cell base station 1 through the radio communication unit 60.

The femtocell base station 1 according to the second exemplary embodiment continues transmission when at least one of the peripheral cell reception quality measured by the mobile station 6 and the peripheral cell reception quality measured by the femtocell base station 1 itself is not sufficient. In short, since the coverage status of the position where the femtocell base station 1 is arranged by the peripheral cell 82 is considered in addition to the coverage status of the position of the mobile station by the peripheral cell 82, it is possible to determine the coverage of the peripheral cell 82 with further accuracy.

As described in the first exemplary embodiment, the mobile station 6 according to the second exemplary embodiment may be a radio terminal with no mobility.

Third Exemplary Embodiment of the Present Invention

In a third exemplary embodiment, a variant example of the second exemplary embodiment described above will be described. The whole configuration of a radio communication system according to the third exemplary embodiment may be the same to that shown in FIG. 1 according to the first exemplary embodiment. Shown in the second exemplary embodiment described above is the example in which the femtocell base station 1 performs determination of the coverage of the peripheral cell 82 using the measurement result of the peripheral cell reception quality. On the other hand, described in the third exemplary embodiment is an example in which the mobile station 6 performs a part of the determination of the coverage of the peripheral cell 82. In short, according to the third exemplary embodiment, the mobile station 6 determines whether the mobile terminal 6 is positioned in an area which is covered only by the femtocell 81 without being covered by the peripheral cell 82, and transmits a message including the determination result to the femtocell base station 1. The femtocell base station 1 finally determines execution of the reduction in transmission power or stop of transmission based on the message contents reported from the plurality of mobile stations 6.

First, with reference to a flowchart shown in FIG. 9, a specific example of an operation of the mobile station 6 according to the third exemplary embodiment will be described. As described in the first exemplary embodiment, the mobile station 6 according to the third exemplary embodiment may be a radio terminal with no mobility.

Figure 9:
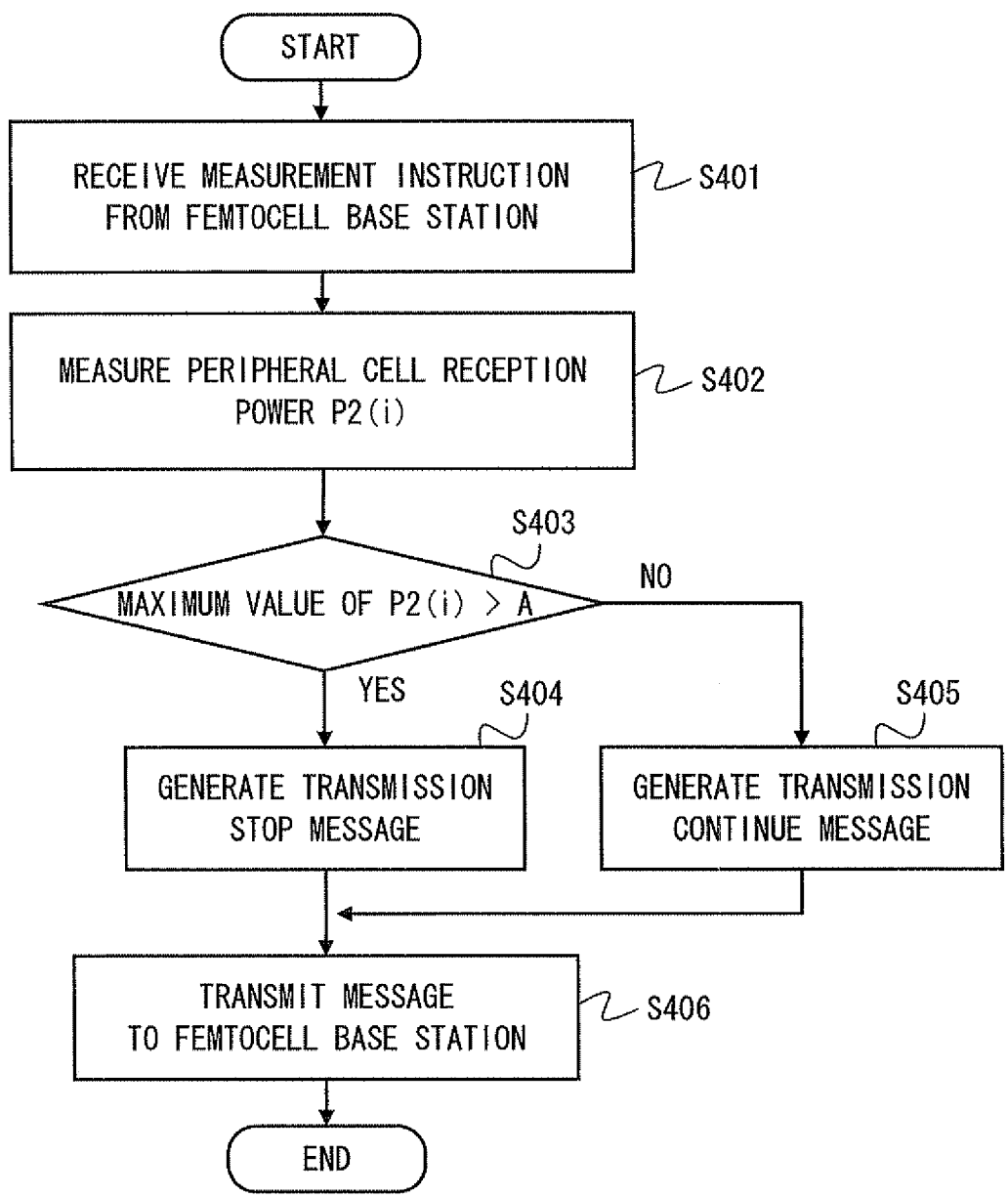
FIG. 9 is a flowchart showing a specific example of procedures for operating a mobile station according to a third exemplary embodiment of the present invention.

Steps S401 and S402 shown in FIG. 9 are the same to steps S301 and S302 shown in FIG. 8; description regarding these steps will be omitted.

In Step S403, the report unit 62 selects the maximum value from the reception power P2(i) measured regarding the M peripheral cells 82, and compares the maximum value with the threshold A. The measurement unit 61 may perform measurement of the reception power P(i) for each of M peripheral cells a plurality of times. In this case, the report unit 62 may calculate a representative value of the reception power p(i) for each of the M peripheral cells, and select the maximum value from the plurality of representative values calculated for each of the plurality of peripheral cells. The representative value may be an X percent value calculated using the measurement value of the plurality of reception qualities, or may be other statistical values such as a minimum value or an average value.

When the maximum value of P2(i) exceeds the threshold A (YES in Step S403), the report unit 62 creates a message (control information) indicating that the femtocell base station may stop (Step S404). This is because, when the femtocell base station 1 to which the mobile station 6 belongs is stopped, the mobile station 6 can belong to the peripheral cell 82, and no influence is considered to be given to the coverage for the mobile station 6 itself. Note that the report unit 62 may create a transmission stop message indicating that the transmission power is gradually reduced by a predetermined amount until when the transmission power is stopped.

On the other hand, when the maximum value of P2(i) is lower than the threshold A (NO in Step S403), the report unit 62 creates a message (control information) to request continuation of transmission by the femtocell base station 1 (Step S405). This is because stop of the femtocell base station 1 to which the base station 6 belongs may influence on the coverage for the mobile station 6 itself. The transmission continuation message may include contents to request continuation of transmission while keeping the same transmission power, for example. Further, when the reception quality (reception power or the like of the pilot signals) of the radio signals from the femto cell base station 1 in the mobile station 6 is above a predetermined standard, the transmission continuation message may include contents to request continuation of transmission while reducing the transmission power. In the latter case, the mobile station 6 may perform measurement of the femtocell reception quality.

In Step S403 shown in FIG. 9, the maximum value is selected from the reception power P(i). However, the minimum value may be selected or other statistical values including an average value may be used.

Figure 10:
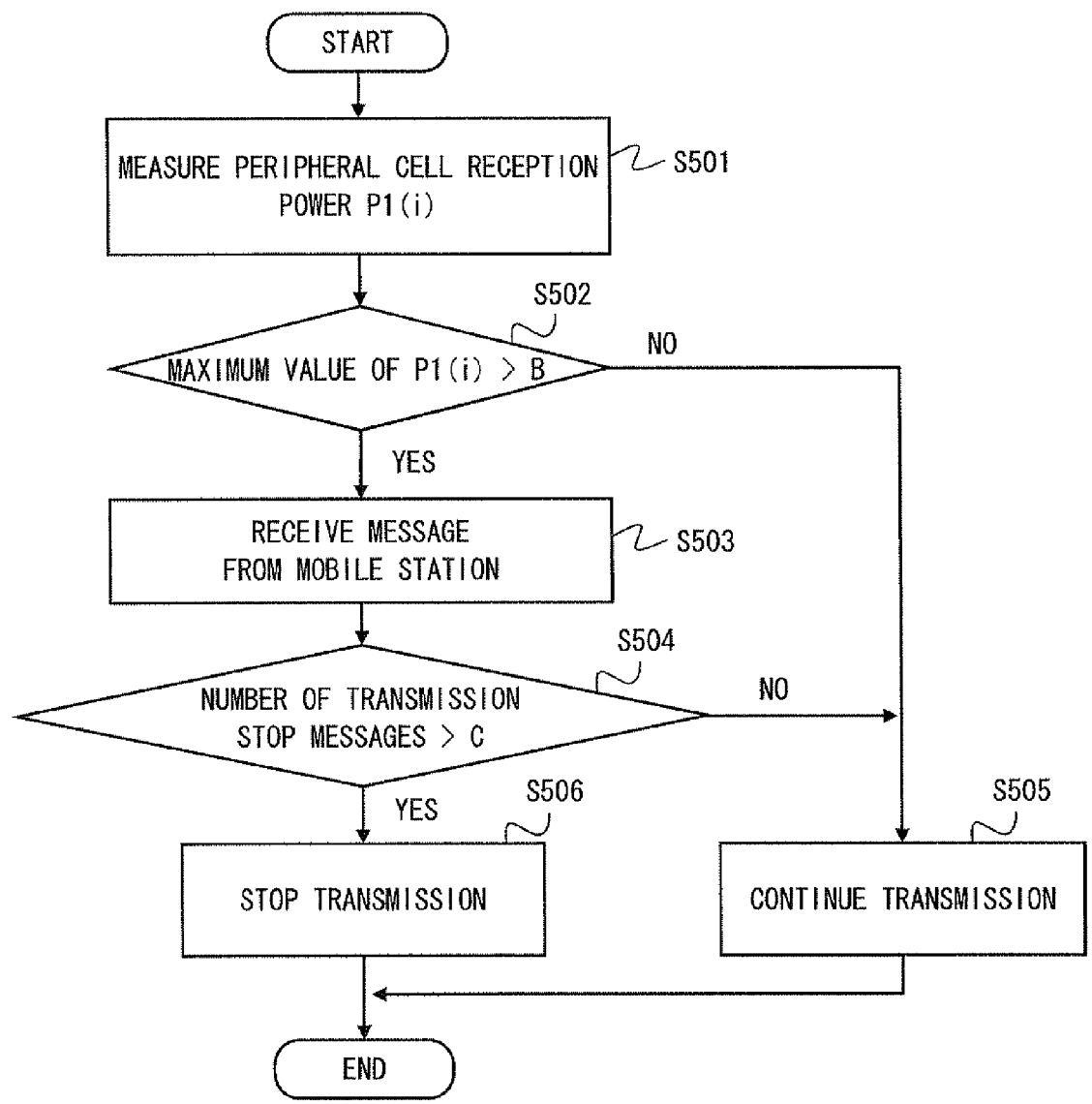
FIG. 10 is a flowchart showing a specific example of procedures for controlling transmission power in a femtocell base station according to the third exemplary embodiment of the present invention.

Next, with reference to a flowchart in FIG. 10, an operation of the femtocell base station 1 according to the third exemplary embodiment will be described. Steps S501 and S502 in FIG. 10 relate to the measurement of the peripheral cell reception quality by the femtocell base station 1 itself. These steps are similar to steps S201 and S202 in FIG. 7 described in the second exemplary embodiment.

When the maximum value of the peripheral cell reception power P(i) exceeds the threshold B (YES in Step S502), the transmission controller 11 performs processing of Step S503 to further determine possibility to stop transmission. In short, in Step S503, the measurement report acquiring unit 111 receives the message (control information) created by the mobile station 6 which belongs to the femto cell 81. The stop determination unit 113 accumulates the received messages.

In Step S504, the stop determination unit 113 compares the number of transmission stop messages included in the accumulated messages with a predetermined threshold C. The determination of the threshold may be performed with respect to a ratio of the transmission stop message to the previous message. When the number of transmission stop messages is equal to or smaller than the threshold C, the stop determination unit 113 determines continuation of transmission (Step S505). On the other hand, when the number of transmission stop messages exceeds the threshold C, the stop determination unit 113 determines stop of transmission (Step S506).

As will be clear from the description in the third exemplary embodiment and the second exemplary embodiment, the procedure for detecting the dead area which is not sufficiently covered by the peripheral cell 82 using the measurement result of the peripheral cell reception quality by the mobile station 6 may be divided between the femto cell base station 1 and the mobile station 6 as appropriate.

Fourth Exemplary Embodiment of the Present Invention

In a fourth exemplary embodiment, in addition to reception quality of the peripheral cell 82 at the position of the mobile station, a method of controlling transmission power of the femtocell base station 1 using the reception quality of the femtocell 81 at the position of the mobile station will be described. Accordingly, it is possible to suppress interference from the femtocell 81 to the peripheral cell 82 while keeping the coverage. Note that the whole configuration of the radio communication system according to the fourth exemplary embodiment may be the same to that shown in FIG. 1 according to the first exemplary embodiment.

Figure 11:
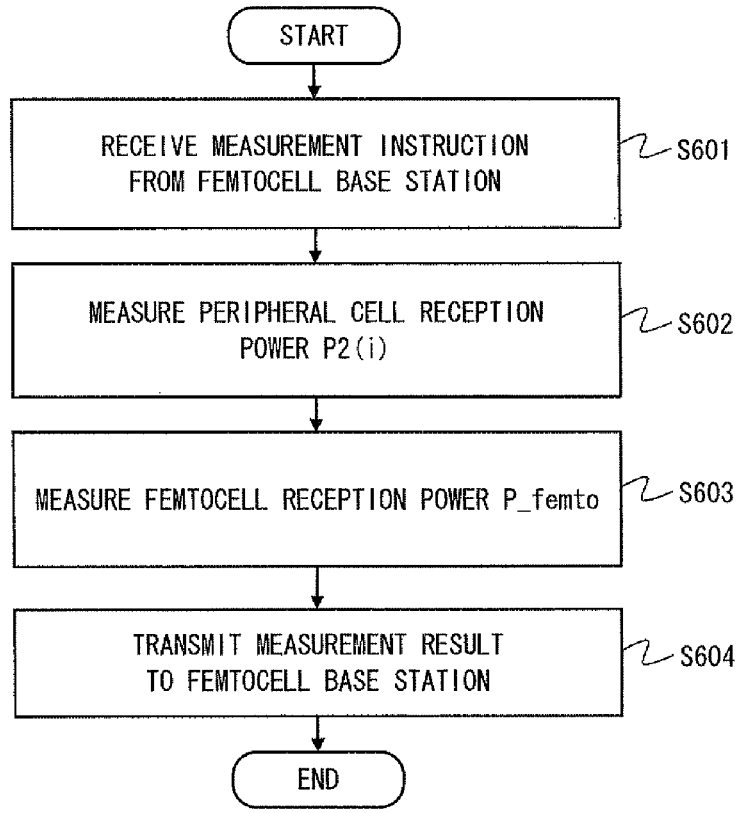
FIG. 11 is a flowchart showing a specific example of procedures for operating a mobile station according to a fourth exemplary embodiment of the present invention.

The mobile station 6 according to the fourth exemplary embodiment measures the peripheral cell reception quality and the femtocell reception quality. FIG. 11 is a flowchart showing a specific example of an operation of the mobile station 6. In the example shown in FIG. 11, the peripheral cell reception power P2(i) is measured as the peripheral cell reception quality, and the femtocell reception power P_femto is measured as the femtocell reception quality. The P_femto is the reception power of radio signals (pilot signals or the like) transmitted from the femtocell base station 1.

In Step S601, the measurement unit 61 receives the measurement instruction from the femtocell base station 1 through the radio communication unit 60. The measurement instruction may include the information of a transmission timing or a transmission frequency of the measurement report. In Step S602, the measurement unit 61 measures the reception power p2(i) of the radio signal reached from the M peripheral cells 82 (where i is an integer from 1 to M). When the mobile station 6 is able to receive only radio waves reached from one peripheral cell 82, the measurement unit 61 may measure the reception power for this one peripheral cell 82. On the other hand, when the mobile station 6 is able to receive radio waves reached from a plurality of peripheral cells 82, the measurement unit 61 may measure the reception power for all the peripheral cells, or measure the reception power of a predetermined number of peripheral cells 82. Further, the measurement unit 61 may measure the peripheral cell 82 whose reception power is a predetermined standard or more.

In Step S603, the measurement unit 61 measures the reception power P_femto of the radio signals reached from the femtocell 81. Last, in Step S604, the report unit 62 reports the measurement result of P_femto and the reception power P2(i) by the measurement unit 61 to the femto cell base station 1 through the radio communication unit 60.

Figure 12:
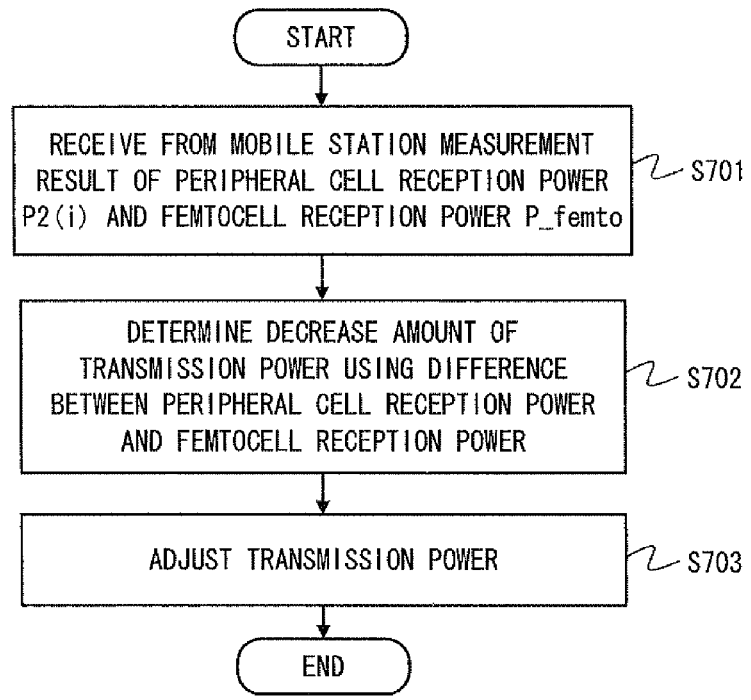
FIG. 12 is a flowchart showing a specific example of procedures for controlling transmission power in a femtocell base station according to the fourth exemplary embodiment of the present invention.

FIG. 12 is a flowchart showing a specific example of the procedures for controlling transmission power of the femtocell base station 1 according to the fourth exemplary embodiment. Described here is an example in which the difference between the peripheral cell reception power P2(i) and the femtocell reception power P_femto measured by the mobile station 6 is used to adjust the transmission power of the femtocell base station 1.

In Step S701, the transmission controller 11 receives the femtocell reception power P_femto and the peripheral cell reception power P2(i) from the mobile station 6 which belongs to the femtocell 81. Note that the transmission controller 11 may receive the difference between P_femto and P2(i) from the mobile station 6. In Step S702, the transmission controller 11 determines a decreased amount of the transmission power using the difference between the femtocell reception power P_femto and the peripheral cell reception power P2(i). Last, in Step S703, the transmission controller 11 controls the radio communication unit 10 so as to reduce the transmission power by the decreased amount that is determined.

In the following description, a specific example of a method of determining the decreased amount of the transmission power in Step S702 will be described.

Procedure (1-1):

First, the difference between P_femto and P2(i) is calculated for the result measured by one or a plurality of mobile stations 6 at different time and different positions of the mobile station which satisfies the condition that P2(i) exceeds a predetermined quality standard (threshold A) and P_femto is equal to or larger than P2(i).

Procedure (1-2):

Next, the representative value of at least one difference calculated in the procedure (1-1) is determined. The representative value of the differences may be the value in which the cumulative probability becomes Y percent (Y is any number from 0 to 100) when the differences are arranged in an ascending order. Further, the representative value may be the minimum value of at least one difference calculated in the procedure (1-1). Further, the representative value may other statistical values including an average value of at least one difference calculated in the procedure (1-1).

Procedure (1-3):

The transmission power of the femtocell base station 1 is reduced based on the representative value of the differences determined in the procedure (1-2). Specifically, the transmission power may be reduced by the representative value of the differences. Thus, the overlap between the femtocell 81 and the peripheral cell 82 can be suppressed. Accordingly, it is possible to suppress interference from the femtocell 81 to the peripheral cell 82 while keeping the coverage in which the femtocell 81 and the peripheral cell 82 are combined. For example, when there is a non-registered mobile station near the femtocell base station 1, the non-registered mobile station performs radio communication with the peripheral cell 82. According to the fourth exemplary embodiment, the interference from the femtocell 81 to the non-registered mobile station can be suppressed.

Note that the determination of the representative value of the differences in the procedure (1-2) may be performed as appropriate depending on which of the suppression of the interference from the femtocell 81 to the peripheral cell 82 and ensuring of the coverage is prioritized. When the representative value of the differences is the minimum value, the decreased amount of the transmission power of the femtocell base station 1 is small. Thus, while the effect of suppressing of the interference is gradual, it is easy to keep the coverage in which the femtocell 81 and the peripheral cell 82 are combined. On the other hand, when the representative value of the differences is the maximum value, the effect of suppressing the interference becomes prominent, whereas the coverage may be temporarily lost. When the average value or the Y percent value is used as the representative value of the differences, the intermediate effect can be obtained. Regardless of which of the representative values is selected, the appropriate coverage can be obtained by repeating the procedures for adjusting the transmission power.

Figure 13:
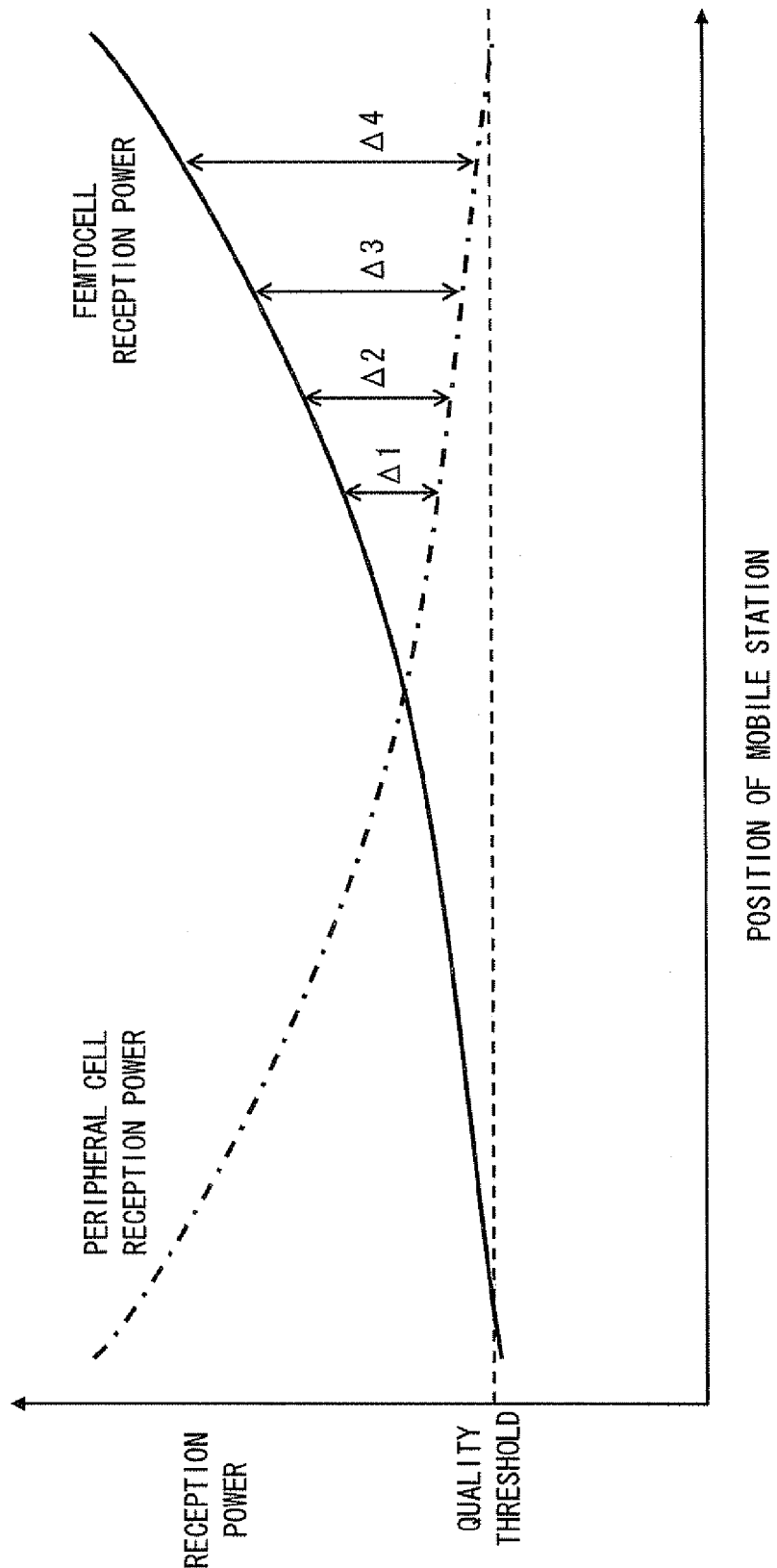
FIG. 13 is a graph showing a relation between femtocell reception power and peripheral cell reception power in a position of the mobile station.
Figure 14:
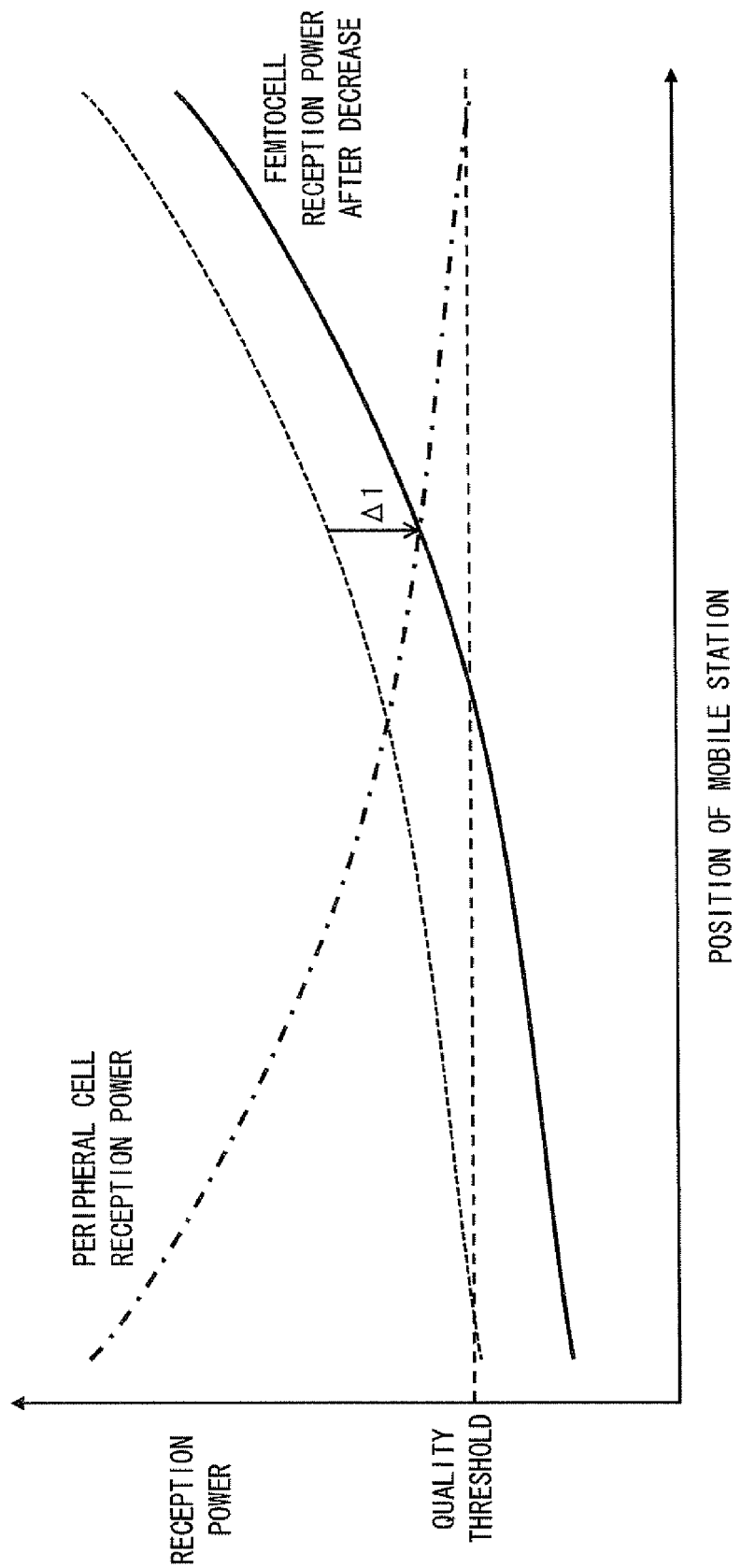
FIG. 14 is a graph showing a relation between femtocell reception power and peripheral cell reception power in a position of the mobile station.

FIGS. 13 and 14 are graphs showing a state of suppression of interference when the minimum value included in a plurality of differences is selected as the representative value in the above procedure (1-2). The horizontal axis of the graph in FIG. 13 indicates a position of the mobile station 6, and the vertical axis indicates reception power in the mobile station 6. The solid graph shown in FIG. 13 indicates femtocell reception power P_femto at the position of the mobile station. Further, a graph of an alternate long and short dash line in FIG. 13 indicates peripheral cell reception power P2(i) at the position of the mobile station.

Consider a case in which four differences $\Delta 1$-$\Delta 4$ shown in FIG. 13 are obtained based on the measurement by the mobile station 6. FIG. 14 shows a case in which the minimum value $\Delta 1$ among the four differences is selected as the representative value, and the transmission power of the femtocell base station 1 is reduced by $\Delta 1$. By reducing the femtocell transmission power by $\Delta 1$, as will be clear from FIG. 14, it is possible to suppress extension of the femtocell 81 to the area covered by the peripheral cell 82 while keeping the coverage in which the femtocell 81 and the peripheral cell 82 are combined. In other words, it is possible to suppress unnecessary overlap of the femtocell 81 and the peripheral cell 82 at cell boundaries, to match the cell boundaries.

In the fourth exemplary embodiment, control for increasing the transmission power of the femtocell base station 1 may further be performed. A specific example of a method of determining the increased amount of the transmission power is shown below.

Procedure (2-1):

First, the difference between the quality standard (threshold A) and P_femto is calculated for the result measured by one or a plurality of mobile stations 6 at different time and different positions of the mobile station which satisfies the condition that both of P2(i) and P_femto are lower than a predetermined quality standard (threshold A).

Procedure (2-2):

Next, a representative value of at least one difference calculated in the procedure (2-1) is determined. The representative value of the differences may be such a value in which the cumulative probability becomes Y percent (Y is any number from 0 to 100) when the differences are arranged in an ascending order, for example. Further, the representative value may be the maximum value of at least one difference calculated in the procedure (2-1). Further, the representative value may be other statistical values including an average value of at least one difference calculated in the procedure (2-1).

Procedure (2-3):

The transmission power of the femtocell base station 1 is increased based on the representative value of the differences determined in the procedure (2-2). More specifically, the transmission power may be increased by the representative value of the differences. Accordingly, it is possible to decrease the dead area and to improve the coverage in which the femtocell 81 and the peripheral cell 82 are combined.

Figure 15:
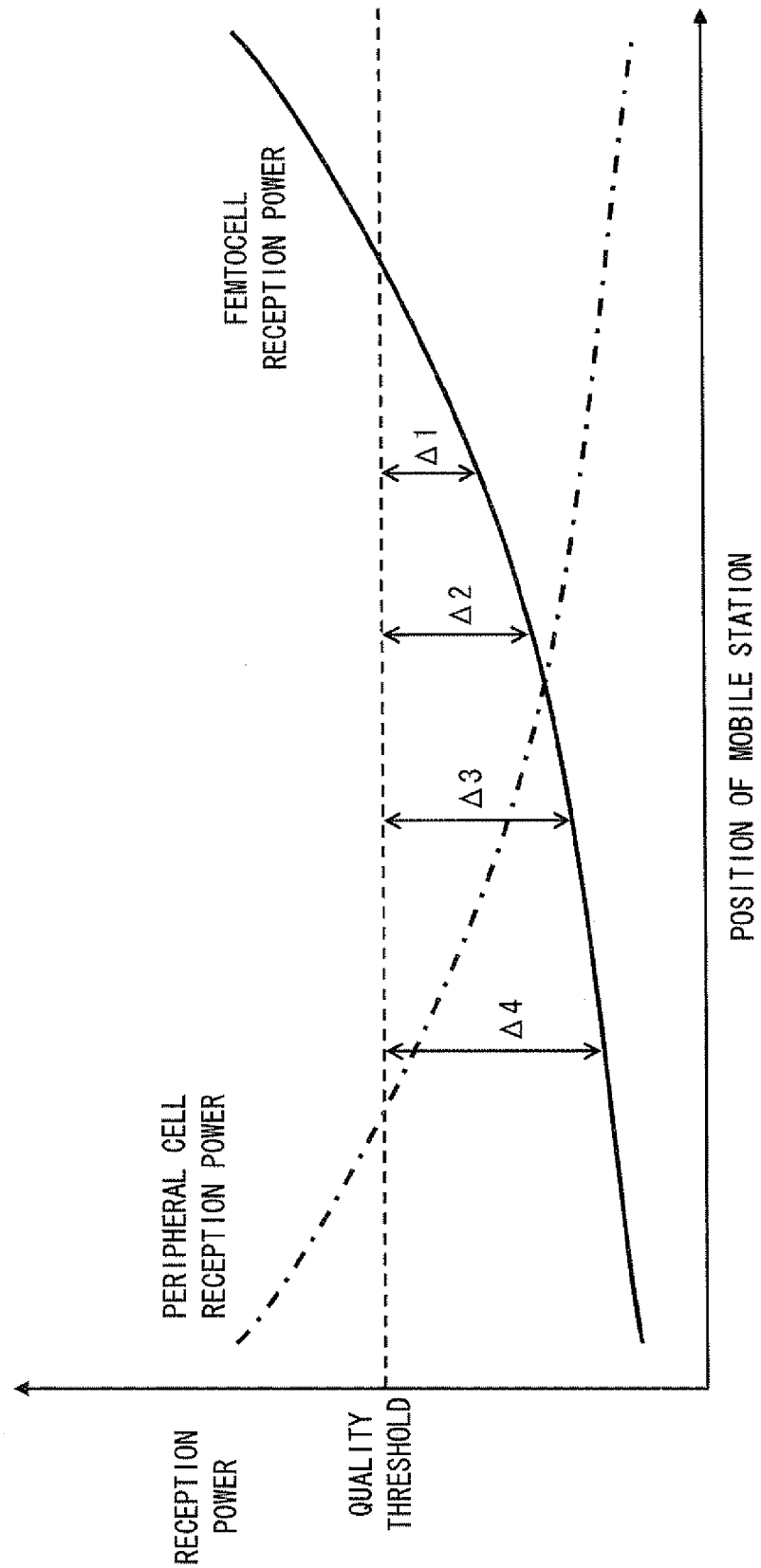
FIG. 15 is a graph showing a relation between femtocell reception power and peripheral cell reception power in a position of the mobile station.
Figure 16:
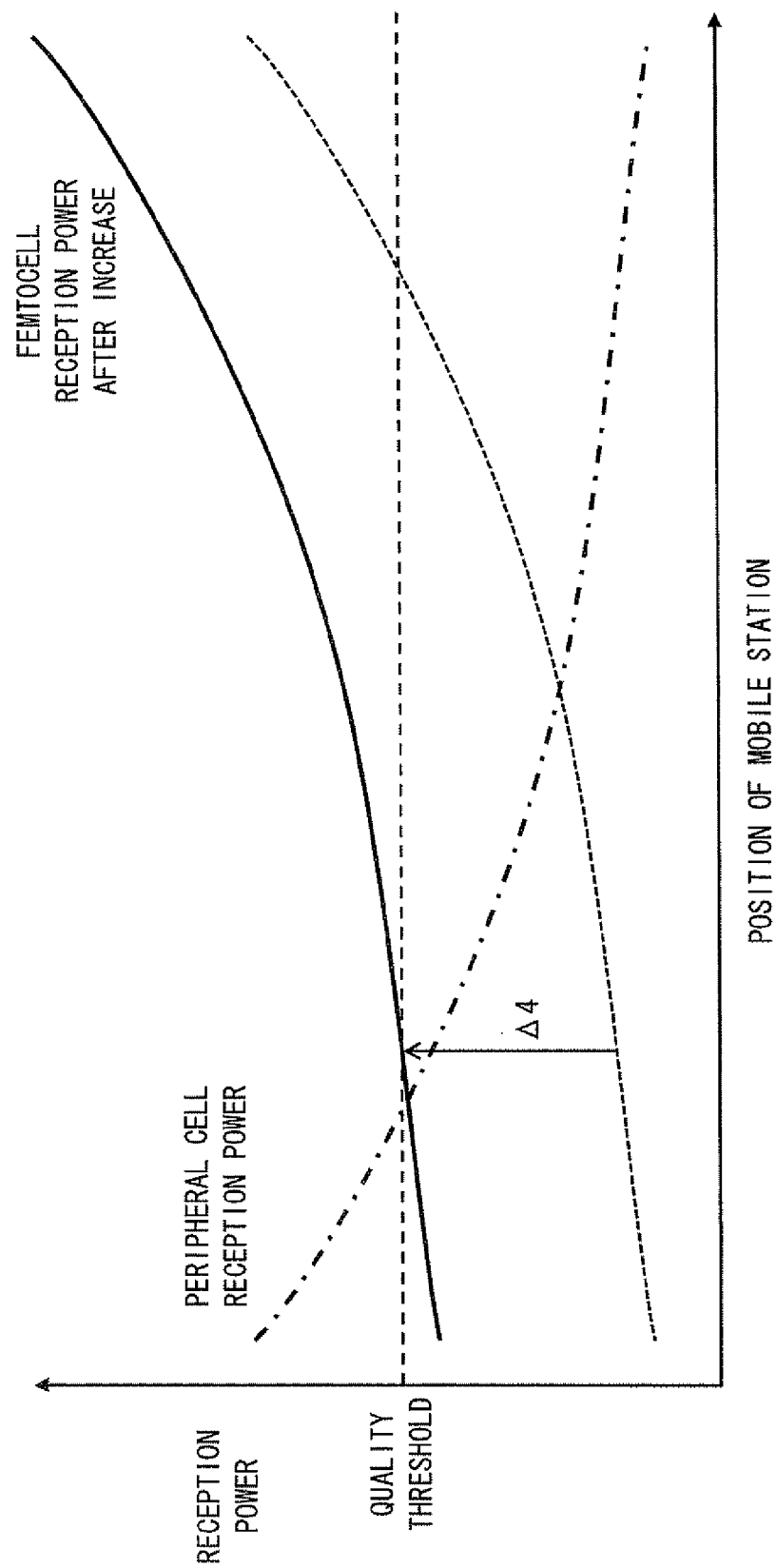
FIG. 16 is a graph showing a relation between femtocell reception power and peripheral cell reception power in a position of the mobile station.

FIGS. 15 and 16 are graphs showing states in which the coverage is improved when the maximum value included in a plurality of differences is selected as a representative value in the procedures (2-2) and (2-3). Consider a case in which four differences $\Delta 1$-$\Delta 4$ shown in FIG. 15 are obtained based on the measurement by the mobile station 6. FIG. 16 shows a case in which the maximum value $\Delta 4$ of the four differences is selected as the representative value, and the transmission power of the femtocell base station 1 is increased by $\Delta 4$. By increasing the femtocell transmission power by Δ4, as will be clear from FIG. 16, it is possible to suppress extension of the femtocell 81 to the area covered by the peripheral cell 82 while improving the coverage in which the femtocell 81 and the peripheral cell 82 are combined. In other words, it is possible to suppress unnecessary overlap between the femtocell 81 and the peripheral cell 82 at cell boundaries, and to match the cell boundaries.

Fifth Exemplary Embodiment

Described in a fifth exemplary embodiment is another example of procedures for controlling transmission power of the femtocell base station 1 that makes it possible to suppress interference from the femtocell 81 to the peripheral cell 82. Described above in the fourth exemplary embodiment is the example in which the decreased amount of the transmission power of the femtocell base station 1 is determined based on the difference between P_femto and P2(i). Described in the fifth exemplary embodiment is an example in which the decreased amount of the transmission power of the femtocell base station 1 is determined based on the difference between P_femto and the quality standard (threshold A).

Procedure (3-1):

First, the difference between P_femto and the quality standard (threshold A) is calculated for the result measured by one or a plurality of mobile stations 6 at different time and different positions of the mobile station which satisfies the condition that P2(i) is lower than a predetermined quality standard (threshold A), and P_femto exceeds a predetermined quality standard (threshold A).

Procedure (3-2):

Next, the representative value of at least one difference calculated in the procedure (3-1) is determined. The representative value of the differences may be such a value in which the cumulative probability becomes Y percent (Y is any number from 0 to 100) when the differences are arranged in an ascending order. Further, the representative value may be the minimum value of at least one difference calculated in the procedure (3-1). Further, the representative value may be other statistical values including an average value of at least one difference calculated in the procedure (3-1).

Procedure (3-3):

The transmission power of the femtocell base station 1 is reduced based on the representative value of the differences determined in the procedure (3-2). More specifically, the transmission power may be reduced by the representative value of the differences. Accordingly, the interference from the femtocell 81 to the peripheral cell 82 can be suppressed while keeping the coverage in which the femtocell 81 and the peripheral cell 82 are combined. For example, when there is a non-registered mobile station near the femtocell base station 1, the non-registered mobile station performs radio communication with the peripheral cell 82. According to the fifth exemplary embodiment, the interference from the femtocell 81 to the non-registered mobile station can be suppressed.

Figure 17:
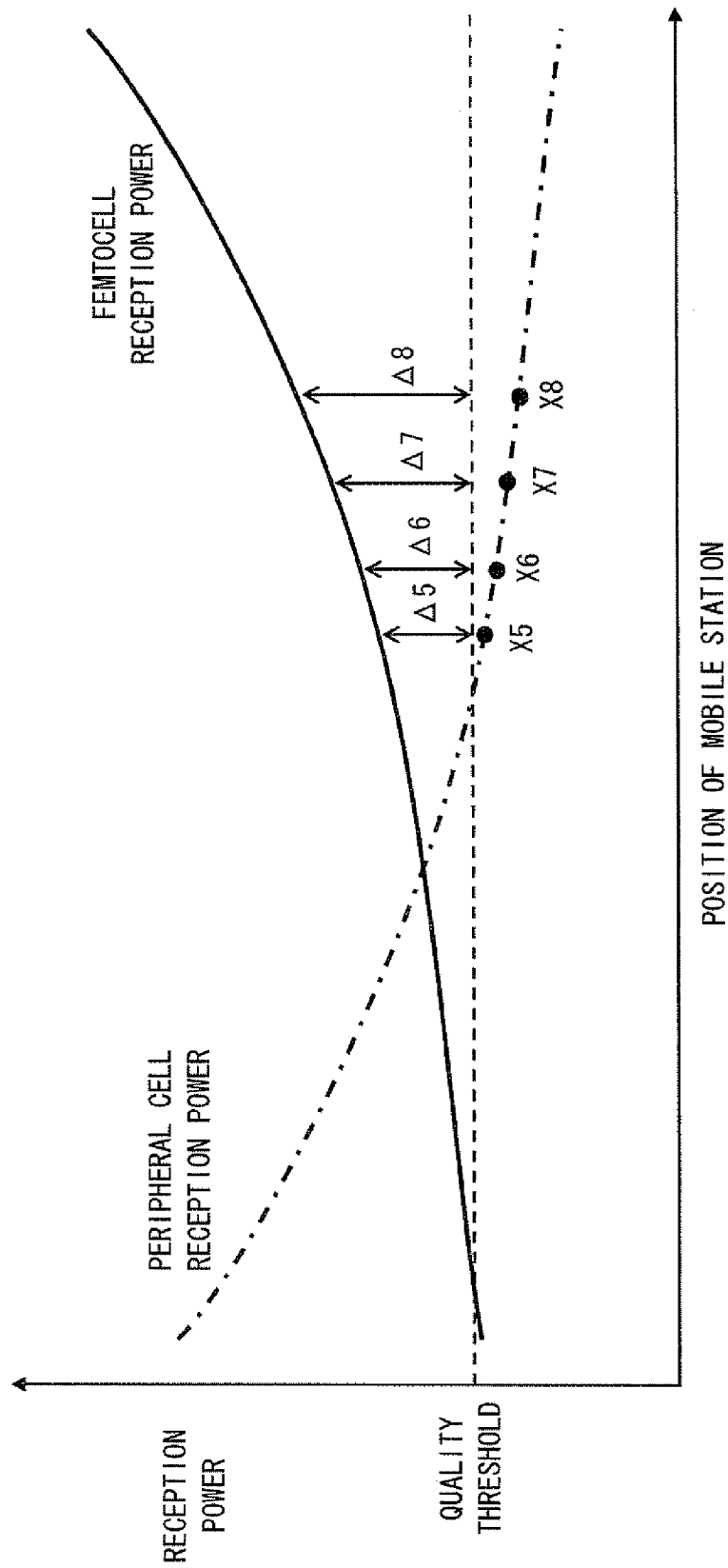
FIG. 17 is a graph showing a relation between femtocell reception power and peripheral cell reception power in a position of the mobile station.
Figure 18:
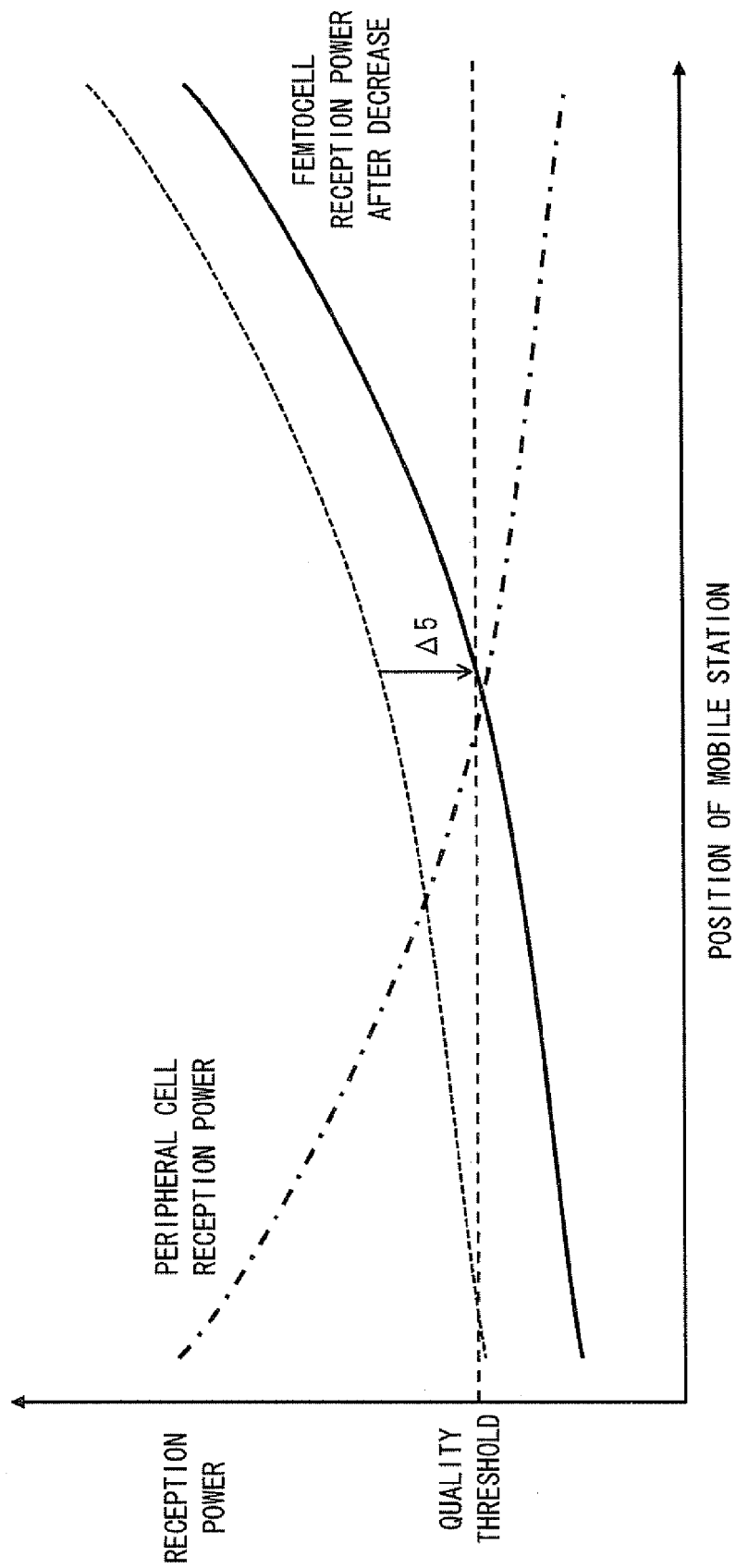
FIG. 18 is a graph showing a relation between femtocell reception power and peripheral cell reception power in a position of the mobile station.

FIGS. 17 and 18 are graphs showing states of suppression of interference when the minimum value included in a plurality of differences is selected as the representative value in the above procedure (3-2). Consider a case in which four differences Δ5-Δ8 shown in FIG. 17 are obtained at four measurement points X5-X8 based on the measurement by the mobile station 6. FIG. 18 shows a case in which the minimum value Δ5 of four differences is selected as the representative value and the transmission power of the femtocell base station 1 is reduced by Δ5. By reducing the femtocell transmission power by Δ5, as will be clear from FIG. 18, it is possible to suppress extension of the femtocell 81 to the area covered by the peripheral cell 82 while keeping the coverage in which the femtocell 81 and the peripheral cell 82 are combined. In other words, it is possible to suppress unnecessary overlap between the femtocell 81 and the peripheral cell 82 at cell boundaries, and to match the cell boundaries.

Sixth Exemplary Embodiment of the Present Invention

In the first to fifth exemplary embodiments of the present invention described above, at least one of the femtocell base station 1 and the peripheral base station 7 may support servicing in a plurality of frequency bands (frequency channels). The servicing in the plurality of frequency bands (frequency channels) includes a frequency hopping technique, or a dual cell technique to provide communication services by two cells having different frequency channels. In this case, the measurement of the femtocell reception quality and the peripheral cell reception quality in the mobile station 6, and the measurement of the peripheral cell reception quality in the femtocell base station 1 may be executed for each frequency channel. Then, the adjustment of the transmission power of the femtocell base station 1 may be performed for each frequency channel using the measurement result for each frequency channel. Accordingly, it is possible to accurately adjust the transmission power of the femtocell base station 1 even when there is frequency dependence in signal propagation characteristics.

For example, in the first exemplary embodiment, the femtocell base station 1 may stop transmission by the femtocell base station 1 when any one reception quality of the plurality of frequency channels exceeds the threshold A. Further, for example, in the fourth and fifth exemplary embodiments in which it is possible to suppress interference with peripheral cells, the increased/decreased amount of the transmission power of the femtocell base station 1 may be determined using the measurement result of the peripheral cell reception power at the position of the mobile station for the same frequency channel as the frequency channel used by the femtocell base station 1.

Seventh Exemplary Embodiment of the Present Invention

The configuration of the femtocell base station 1 described in the first to sixth exemplary embodiments of the present invention described above is only one example, and other configurations may be possible. For example, the determination of stop using the measurement report of the mobile station 6 may be executed by an apparatus arranged in a higher-order network of the femtocell base station 1, e.g., a radio network controller (RNC). In this case, the stop determination unit 113 may be arranged in the RNC. The stop determination unit 113 arranged in the RNC may receive the measurement report of the peripheral cell reception quality from the femtocell base station 1, to execute determination of stop. Further, the transmission controller 114 may also be arranged in the RNC as is similar to the stop determination unit 113. In short, the transmission controller 114 arranged in the RNC according to the determination result of the stop determination unit 113 may create the control instruction of the transmission power, to transmit the control instruction to the femtocell base station 1. In this way, the measurement of the reception power, stop determination, and the transmission power control of the femtocell base station 1 may be arbitrarily divided between the femtocell base station 1 and a higher-order network connected to the femtocell base station 1.

Other Exemplary Embodiments

The first to seventh exemplary embodiments of the present invention described above are applicable to various radio communication systems including a W-CDMA system, an E-UTRA system, and IEEE 802.16m.

Further, described in a part of the first to seventh exemplary embodiments of the present invention is an example in which the femtocell base station 1 measures the peripheral cell reception quality. However, the femtocell base station 1 may not measure the peripheral cell reception quality.

Further, the transmission power control of the femtocell base station 1 described in the first to seventh exemplary embodiments of the present invention may be applied to other base stations than the femtocell base station, e.g., a pico base station, a micro base station, and a macro base station covering wider range than the femtocell base station.

The procedure for adjusting the transmission power of the femtocell base station 1 described in the second to seventh exemplary embodiments of the present invention may be achieved by causing a computer including a microprocessor to execute a program to control the base station, as is similar to description in the first exemplary embodiment of the present invention.

A program for controlling a base station can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Needless to say, the present invention is not limited to the exemplary embodiments stated above, but various changes may be made without departing from the spirit of the present invention already described.

This application claims the benefit of priority, and incorporates herein by reference in its entirety, the following Japanese Patent Application No. 2009-278373 filed on Dec. 8, 2009.

REFERENCE SIGNS LIST

1 Femtocell Base Station
6 Radio Terminal (Mobile Station)
7 Peripheral Base Station
10 Radio Communication Unit
11 Transmission Controller
111 Measurement Report Receiving Unit
112 Measurement Unit
113 Stop Determination Unit
114 Transmission Controller
60 Radio Communication Unit
61 Measurement Unit
62 Report Unit
81 Femtocell
82 Peripheral Cell

The invention claimed is:

1. A radio communication system comprising:
at least one first base station which transmits a first downlink radio signal;
a second base station which transmits a second downlink radio signal;
at least one radio terminal configured to receive the first downlink radio signal and the second downlink radio signal;
wherein the second base station comprises a control unit that controls a transmission power of the second downlink radio signal based on a calculated difference between the reception quality of the second downlink radio signal and the reception quality of the first downlink radio signal measured by the at least one radio terminal, such that a reception quality of the second downlink radio signal exceeds a second predetermined value of reception quality at a position of the at least one radio terminal at which a reception quality of the first downlink radio signal is lower than a first predetermined value of reception quality based on a measurement value of the reception quality of the first downlink radio signal by the at least one radio terminal;
wherein, when the at least one radio terminal calculates the calculated difference between the reception quality of the second downlink radio signal and the reception quality of the first downlink radio signal at a position of the at least one radio terminal at which the reception quality of the first downlink radio signal exceeds the first predetermined value and the reception quality of the second downlink radio signal exceeds the reception quality of the first downlink radio signal, the control unit decreases the transmission power of the second downlink radio signal based on the calculated difference.

2. The radio communication system according to claim 1, wherein the control unit controls the transmission power of the second downlink radio signal so that the reception quality of the second downlink radio signal is equal to or smaller than the reception quality of the first radio signal at a position of the radio terminal at which the reception quality of the first radio signal exceeds the first predetermined value.

3. The radio communication system according to claim 1, wherein
the at least one radio terminal is configured to measure the reception quality of the second downlink radio signal and the reception quality of the first downlink radio signal.

4. The radio communication system according to claim 3, wherein
the control unit obtains a statistical representative value based on a plurality of calculated differences when the reception quality of the first downlink radio signal exceeds the first predetermined value and the reception quality of the second downlink radio signal exceeds the reception quality of the first radio signal, and
the control unit decreases the transmission power of the second downlink radio according to the statistical representative value.

5. The radio communication system according to claim 4, wherein the statistical representative value comprises a maximum value of the plurality of calculated differences, a minimum value of the plurality of calculated differences, an average value of the plurality of calculated differences, or an X percent value (where 0≤X≤100) of the plurality of calculated differences.

6. The radio communication system according to claim 1, wherein the control unit controls the transmission power of the second downlink radio signal so that the reception quality of the second downlink radio signal is equal to or smaller than the second predetermined value at a position of the radio terminal at which the reception quality of the first downlink radio signal exceeds the first predetermined value.

7. The radio communication system according to claim 1, wherein the control unit selects, from among a plurality of measurement values of the reception quality of the first downlink radio signal, a selected measurement value at which the reception quality of the first downlink radio signal is equal to or larger than the first predetermined value and the closest of the plurality of measurement values to the first predetermined value and controls the transmission power of the second downlink radio signal so that the reception quality of the second downlink radio signal at the position of the radio terminal approaches the selected measurement value of the reception quality of the first downlink radio signal.

8. The radio communication system according to claim 1, wherein the control unit controls the transmission power of the second downlink radio signal according to a calculated difference between the second predetermined value and the reception quality of the second downlink radio signal at a position of the radio terminal at which the reception quality of the first downlink radio signal is equal to the first predetermined value.

9. The radio communication system according to claim 1, wherein the control unit controls the transmission power of the second downlink radio signal so that the reception quality of the second downlink radio signal approaches the second predetermined value at a position of the radio terminal at which the reception quality of the first downlink radio signal is lower than the first predetermined value.

10. The radio communication system according to claim 9, wherein the control unit selects, from among a plurality of measurement values of the reception quality of the first downlink radio signal, a selected measurement value at which the reception quality of the first downlink radio signal is equal to or smaller than the first predetermined value and the closest of the plurality of measurement values to the first predetermined value and controls the transmission power of the second downlink radio signal so that the reception quality of the second downlink radio signal at a position of the radio terminal approaches the second predetermined value.

11. The radio communication system according to claim 1, wherein the control unit stops transmission of the second downlink radio signal when a statistical representative value exceeds the first predetermined value, wherein the statistical representative value is based on a plurality of measurement values of the reception quality of the first downlink radio signal measured by the at least one radio terminal.

12. The radio communication system according to claim 11, wherein the control unit stops transmission of the second downlink radio signal by gradually reducing transmission power of the second downlink radio signal.

13. The radio communication system according to claim 11, wherein the control unit continues transmission of the second downlink radio signal is continued when the statistical representative value is lower than the first predetermined value.

14. The radio communication system according to claim 11, wherein the statistical representative value comprises a maximum value of the plurality of measurement values, a minimum value of the plurality of measurement values, an average value of the plurality of measurement values, or an X percent value (where 0≤X≤100) of the plurality of measurement values.

15. The radio communication system according to claim 1,
wherein the at least one radio terminal transmits a plurality of measurement values of the reception quality of the first downlink radio signal to the second base station; and
wherein the control unit continues transmission of the second downlink radio signal when a measurement value is lower than the first predetermined value standard is included in the plurality of measurement values.

16. The radio communication system according to claim 1, wherein
the at least one first base station comprises a plurality of first base stations which transmit a plurality of first downlink radio signals,
each of the at least one radio terminal measures reception qualities of each of the plurality of first downlink radio signals, and
the control unit determines a selected base station from among the plurality of first base stations, wherein a reception quality of the first downlink radio signal from the selected base station is the best reception quality of the plurality of first downlink radio signals, and
the control unit controls the transmission power of the second downlink radio signal so that the reception quality of the second downlink radio signal exceeds the second predetermined value at a position of the at least one radio terminal at which the reception quality of the first downlink radio signal from the selected base station is lower than the first predetermined value.

17. The radio communication system according to claim 1, wherein
the at least one radio terminal transmits control information indicating whether it is necessary to adjust the transmission power of the second downlink radio signal based on the reception quality of the first downlink radio signal, and
the control unit controls the transmission power of the second downlink radio signal based on the control information.

18. The radio communication system according to claim 17, wherein
the control information indicates a continuation of transmission of the second downlink radio signal, and
the at least one radio terminal transmits the control signal when the reception quality of the first downlink radio signal is below the first predetermined value.

19. The radio communication system according to claim 17, wherein
the control information indicates a stop of transmission of the second downlink radio signal, and
the at least one radio terminal transmits the control signal when the reception quality of the first downlink radio signal exceeds the first predetermined value.

20. The radio communication system according to claim 17, wherein the control unit receives a plurality of transmissions of the control information from the at least one radio terminal, and controls the transmission power of the second downlink radio signal based on the plurality of transmissions of the control information.

21. The radio communication system according to claim 1, wherein
the at least one first base station uses a plurality of frequency channels, and the first downlink radio signal is transmitted in each of the plurality of frequency channels, and
the control unit controls transmission of the second downlink radio signal based on a measurement result of the reception quality of the first downlink radio signal transmitted in at least one of the plurality of frequency channels.

22. The radio communication system according to claim 1, wherein
the at least one first base station uses a plurality of frequency channels, and the first downlink radio signal is transmitted in each of the plurality of frequency channels, and
the control unit controls transmission of the second downlink radio signal based on a measurement result of the reception quality of the first downlink radio signal transmitted in a frequency channel which is the same as a frequency channel in which the second radio downlink signal is transmitted.

23. The radio communication system according to claim 1, wherein
the second base station is configured to measure the reception quality of the first downlink radio signal, and
the control unit continues transmission of the second downlink radio signal when the reception quality of the first downlink radio signal measured by the at least one radio terminal or a representative value thereof is lower than the first predetermined value, or when a measurement result of the first downlink radio signal measured by the second base station is lower than a third predetermined value.

24. The radio communication system according to claim 1, wherein
the second base station is configured measure the reception quality of the first downlink radio signal, and
the control unit controls stops transmission of the second downlink radio signal when the reception quality of the first downlink radio signal measured by the at least one radio terminal or a representative value thereof exceeds the first predetermined value and a measurement result of the first downlink radio signal measured by the second base station exceeds a third predetermined value.

25. The radio communication system according to claim 1, wherein the reception quality of the first downlink radio signal comprises the reception power of the first downlink radio signal.

26. The radio communication system according to claim 1, wherein the second predetermined value is equal to the first predetermined value.

27. The radio communication system according to claim 1, wherein the at least one radio terminal comprises a mobile radio station which is configured to interactively communicate with the first base station and the second base stations by radio, and a fixed radio station which receives the first downlink radio signal and the second downlink radio signal at a predetermined position.

28. A base station apparatus comprising:
a radio communication unit that performs radio communication with at least one mobile station; and
a control unit that controls transmission power of the radio communication unit,
wherein the control unit controls transmission power of a downlink radio signal transmitted by the radio communication unit, based on a calculated difference between the reception quality of the downlink radio signal and the reception quality of a peripheral cell downlink radio signal, measured by the at least one mobile station, so that a reception quality of the downlink radio signal exceeds a second predetermined value of reception quality at a position of the at least one radio terminal at which a reception quality of the peripheral cell downlink radio signal is lower than a first predetermined value of reception quality based on a measurement value of the reception quality of the peripheral cell downlink radio signal by the at least one mobile station, and
the control unit controls the transmission power of the downlink radio signal based on the calculated difference calculated at least one position of the mobile station at which the reception quality of the peripheral cell downlink radio signal exceeds the first predetermined value and the reception quality of the downlink radio signal exceeds the reception quality of the peripheral cell downlink radio signal, and the control unit controls the transmission power of the downlink radio signal to decrease the transmission power of the downlink radio signal according to the calculated difference.

29. The base station apparatus according to claim 28, wherein the control unit controls the transmission power of the downlink radio signal so that the reception quality of the downlink radio signal is equal to or smaller than the reception quality of the peripheral cell downlink radio signal at a position of the mobile station at which the reception quality of the peripheral cell downlink radio signal exceeds the first predetermined value.

30. The base station apparatus according to claim 28, wherein
the at least one mobile station is configured to measure the reception quality of the downlink radio signal and the reception quality of the peripheral cell downlink radio signal.

31. The base station apparatus according to claim 30, wherein
the control unit obtains a statistical representative value based on a plurality of calculated differences when the reception quality of the peripheral cell downlink radio signal exceeds the first predetermined value and the reception quality of the downlink radio signal exceeds the reception quality of the peripheral cell downlink radio signal, and
the control unit decreases the transmission power of the downlink radio signal according to the statistical representative value.

32. The base station apparatus according to claim 28, wherein the control unit controls the transmission power of the downlink radio signal so that the reception quality of the downlink radio signal, as measured by the mobile station at a position at which the reception quality of the peripheral cell downlink radio signal exceeds the first predetermined value, is equal to or smaller than the second predetermined value.

33. The base station apparatus according to claim 28, wherein the control unit controls the transmission power of the downlink radio signal according to a difference between the second predetermined value and the reception quality of the downlink radio signal at a position of the mobile station at which the reception quality of the peripheral cell downlink radio signal is equal to the first predetermined value.

34. The base station apparatus according to claim 28, wherein the control unit controls the transmission power of the downlink radio signal so that the reception quality of the downlink radio signal approaches the second predetermined value at a position of the mobile station at which the reception quality of the peripheral cell downlink radio signal is lower than the first predetermined value.

35. The base station apparatus according to claim 34, wherein the control unit selects, from among a plurality of measurement values of the reception quality of the first downlink radio signal, a selected measurement value of the peripheral cell downlink signal at which the reception quality of the peripheral cell downlink signal is equal to or smaller than the first predetermined value and the closest of the plurality of measurement values to the first predetermined value and controls the transmission power of the downlink radio signal so that the reception quality of the downlink radio signal at a position of the mobile station approaches the second predetermined value.

36. The base station apparatus according to claim 28, wherein the control unit stops the transmission of the downlink radio signal when a statistical representative value based on a plurality of measurement values of the reception quality of the peripheral cell downlink radio signal measured by the at least one mobile station exceeds the first predetermined value.

37. The base station apparatus according to claim 36, wherein the control unit stops the transmission of the downlink radio by gradually reducing transmission power of the downlink radio signal.

38. The base station apparatus according to claim 36, wherein the control unit continues transmission of the downlink radio signal when the statistical representative value is lower than the first predetermined value.

39. The base station apparatus according to claim 28, wherein
the radio communication unit is configured to measure the reception quality of the peripheral cell downlink radio signal, and
the control unit stops transmission of the downlink radio signal when the reception quality of the peripheral cell downlink radio signal measured by the at least one mobile station or a representative value thereof exceeds the first predetermined value, and when the measurement result of the peripheral cell downlink radio signal measured by the radio communication unit exceeds a third predetermined value.

40. A control apparatus of a base station, the control apparatus comprising:
a control unit that controls transmission power of a downlink radio signal transmitted by the base station, based on a calculated difference between the reception quality of the downlink radio signal and the reception quality of a peripheral cell downlink radio signal, measured by at least one mobile station, so that a reception quality of the downlink radio signal transmitted from the base station exceeds a second predetermined value of reception quality, at a position of a mobile station at which a reception quality of the peripheral cell downlink radio signal is lower than a first predetermined value based on a measurement result by the at least one mobile station of the reception quality of the peripheral cell downlink radio signal, wherein the mobile station is in radio communication with the base station,
wherein the control unit controls the transmission power of the downlink radio signal based on the calculated difference calculated at least one position of the mobile station at which the reception quality of the peripheral cell downlink radio signal exceeds the first predetermined value and the reception quality of the downlink radio signal exceeds the reception quality of the peripheral cell radio signal, and the control unit controls the transmission power of the downlink radio signal to decrease the transmission power of the downlink radio signal according to the calculated difference.

41. A method of controlling transmission power of a base station, the method comprising:
obtaining a reception quality of a peripheral cell downlink radio signal as measured by at least one mobile station in communication with the base station; and
controlling a transmission power of an downlink radio signal transmitted by the base station, based on a calculated difference between the reception quality of the downlink radio signal and the reception quality of the peripheral cell downlink radio signal, measured by the at least one mobile station, so that a reception quality of the downlink radio signal exceeds a second predetermined value of reception quality, as measured by the at least one mobile station at a position at which the reception quality of the peripheral cell downlink radio signal is lower than a first predetermined value of reception quality standard,
wherein the controlling the transmission power of the downlink radio signal further comprises controlling the transmission power of the downlink radio signal based on the calculated difference calculated at least one position of the mobile station at which the reception quality of the peripheral cell downlink radio signal exceeds the first predetermined value and the reception quality of the downlink radio signal exceeds the reception quality of the peripheral cell downlink radio signal, and the control unit controls the transmission power of the downlink radio signal to decrease the transmission power of the downlink radio signal according to the calculated difference.

42. A non-transitory computer readable medium storing a program for causing a computer to execute control processing regarding base station equipment that performs radio communication with a mobile station, wherein
the control processing comprises:
acquiring a reception quality of a peripheral cell downlink radio signal as measured by the mobile station in communication with the base station; and
controlling a transmission power of downlink radio signal transmitted by the base station, based on a calculated difference between the reception quality of the downlink radio signal and the reception quality of the peripheral cell downlink radio signal, measured by the at least one mobile station, so that a reception quality of the downlink radio signal exceeds a second predetermined value of reception quality, as measured by the mobile station at a position at which the reception quality of the peripheral cell downlink radio signal is lower than a first predetermined reception quality,
wherein the controlling the transmission power of the downlink radio signal further comprises controlling the transmission power of the downlink radio signal based on the calculated difference calculated at least one position of the mobile station at which the reception quality of the peripheral cell downlink radio signal exceeds the first predetermined value and the reception quality of the downlink radio signal exceeds the reception quality of the peripheral cell downlink radio signal, and the control unit controls the transmission power of the downlink radio signal to decrease the transmission power of the downlink radio signal according to the calculated difference.

43. A radio communication system comprising:
a base station comprising:
a radio communication unit which transmits a downlink radio signal to at least one mobile station;

a control unit which controls a transmission power of the downlink radio signal, based on a calculated difference between the reception quality of the downlink radio signal and the reception quality of a peripheral cell downlink radio signal, measured by the at least one mobile station, such that a reception quality of the downlink radio signal exceeds a second predetermined value of reception quality, as measured by the at least one mobile station at a position at which a reception quality of the peripheral cell downlink radio signal is less than a first predetermined value of reception quality, wherein the control unit controls the transmission power of the downlink radio signal based on the calculated difference calculated at least one position of the mobile station at which the reception quality of the peripheral cell downlink radio signal exceeds the first predetermined value and the reception quality of the downlink radio signal exceeds the reception quality of the peripheral cell downlink radio signal, and the control unit controls the transmission power of the downlink radio signal to decrease the transmission power of the downlink radio signal according to the calculated difference.

44. The radio communication system according to claim 43, further comprising:
the at least one mobile station comprising:
a measurement unit which measures a reception quality of the downlink radio signal and a reception quality of the peripheral cell downlink radio signal; and
a report unit which reports the measured reception quality of the downlink radio signal and the measured reception quality of the peripheral cell downlink radio signal to the base station.

45. The radio communication system according to claim 43, further comprising:
the at least one mobile station comprising:
a measurement unit which measures a reception quality of the downlink radio signal and a reception quality of the peripheral cell downlink radio signal; and
a report unit which, when the measured reception quality of the peripheral cell downlink radio signal is greater than the first predetermined value, transmits a stop message to the base station, and which, when the measured reception quality of the peripheral cell downlink radio signal is less than the first predetermined value, transmits a continue message to the base station,
wherein, when the base station receives the stop message, the control unit stops transmission of the downlink radio signal, and when the base station receives the continue message, the control unit continues transmission of the downlink radio signal.

* * * * *